(12) United States Patent
Magro et al.

(10) Patent No.: US 9,558,148 B2
(45) Date of Patent: Jan. 31, 2017

(54) METHOD TO OPTIMIZE NETWORK DATA FLOWS WITHIN A CONSTRAINED SYSTEM

(71) Applicants: William R. Magro, Champaign, IL (US); Arlin R. Davis, Yamhill, OR (US); Jerrie L. Coffman, Hillsboro, OR (US); Robert J. Woodruff, Banks, OR (US); Jianxin Xiong, Sammamish, WA (US)

(72) Inventors: William R. Magro, Champaign, IL (US); Arlin R. Davis, Yamhill, OR (US); Jerrie L. Coffman, Hillsboro, OR (US); Robert J. Woodruff, Banks, OR (US); Jianxin Xiong, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 14/266,241

(22) Filed: Apr. 30, 2014

(65) Prior Publication Data

US 2015/0317280 A1 Nov. 5, 2015

(51) Int. Cl.
*G06F 13/20* (2006.01)
*G06F 15/17* (2006.01)
(Continued)

(52) U.S. Cl.
CPC .......... *G06F 15/17* (2013.01); *G06F 13/4068* (2013.01); *G06F 13/4221* (2013.01); *G06F 13/4278* (2013.01); *G06F 15/17331* (2013.01)

(58) Field of Classification Search
None
See application file for complete search history.

(56) References Cited

U.S. PATENT DOCUMENTS

| 8,914,556 B2* | 12/2014 | Magro | G06F 13/14 710/22 |
| 2014/0129858 A1* | 5/2014 | Varma | G06F 13/382 713/322 |
| 2016/0149801 A1* | 5/2016 | Morosan | H04L 45/22 370/228 |

OTHER PUBLICATIONS

Office Action received for Korean Patent Application No. 10-2015-0043268, mailed on May 2, 2016, 5 pages of Office Action including 2 pages of English Translation.

* cited by examiner

*Primary Examiner* — Ilwoo Park
(74) *Attorney, Agent, or Firm* — Law Office of R. Alan Burnett, P.S

(57) ABSTRACT

Methods, apparatus, and software for optimizing network data flows within constrained systems. The methods enable data to be transferred between PCIe cards in multi-socket server platforms, each platform including a local socket having an InfiniBand (IB) HCA and a remote socket. Data to be transmitted outbound from a platform is transferred from a PCIe card to the platform's IB HCA via a proxied datapath. Data received at a platform may employ a direct PCIe peer-to-peer (P2P) transfer if the destined PCIe card is installed in the local socket or via a proxied datapath if the destined PCIe card is installed in a remote socket. Outbound transfers from a PCIe card in a local socket to the platform's IB HCA may selectively be transferred using an either a proxied data path for larger data transfers or a direct P2P datapath for smaller data transfers. The software is configured to support each of local-local, remote-local, local-remote, and remote-remote data transfers in a manner that is transparent to the software applications generating and receiving the data.

30 Claims, 15 Drawing Sheets

(51) Int. Cl.
  *G06F 13/42* (2006.01)
  *G06F 13/40* (2006.01)
  *G06F 15/173* (2006.01)

Overview of Modes: (KL = MIC local socket to HCA, KR = MIC remote socket to HCA)

- KL to KL (outside box)
  MIC -> Xeon -> HCA -> Fabric --------> HCA -> MIC       (Proxy out -> Direct in)
  MIC <- HCA <---------- Fabric <- HCA <- Xeon <- MIC      (Direct in <- Proxy out)

- KL to Xeon (outside box)
  MIC -> Xeon -> HCA -> Fabric -> HCA -> Xeon             (Proxy out -> Direct in)
  MIC <- HCA <---------- Fabric <- HCA <- Xeon            (Direct in <- Direct out)

- KL to KR (outside box)
  MIC -> Xeon -> HCA -> Fabric -> HCA -> Xeon -> MIC       (Proxy out -> Proxy in)
  MIC <- HCA <---------- Fabric <- HCA <- Xeon <- MIC      (Direct in <- Proxy out)

- KR to KR (outside box)
  MIC -> Xeon -> HCA -> Fabric -> HCA -> Xeon -> MIC       (Proxy out -> Proxy in)
  MIC <- Xeon -> HCA <- Fabric <- HCA <- Xeon <- MIC       (Proxy in <- Proxy out)

- KR to Xeon (outside box)
  MIC -> Xeon -> HCA -> Fabric -> HCA -> Xeon              (Proxy out -> Direct in)
  MIC <- Xeon <- HCA <- Fabric <- HCA <- Xeon              (Proxy in <- Direct out)

METHOD TO OPTIMIZE NETWORK DATA FLOWS WITHIN A CONSTRAINED SYSTEM

BACKGROUND INFORMATION

In recent years, implementation of "cloud-based" services, high-performance computing (HPC) and other activities employing data centers and the like have seen widespread adoption. Under a typical data center installation, a large number of servers installed in server chasses and server racks are interconnected in communication using network links (e.g., Ethernet or InfiniBand) and various switching mechanisms, such as switch blades/modules and "top-of-rack" (ToR) switches.

Under aspects of HPC, a very large number of compute nodes are implemented to solve various tasks in a parallel or substantially parallel manner. In essence, each compute node performs one part of a larger, more complex task. In order to implement this scheme, there needs to be input data to and output data must be exchanged among compute nodes. This data is communicated using one or more interconnects.

Various types of interconnects are used to interconnect the computer nodes in an interconnect hierarchy. For example, at the top of the hierarchy are interconnects between computing cores in the same processor. At the next level are interconnects between processors in the same platform, such as server blade or module. Next are interconnects between platforms, such as a backplane in a blade server. This is followed by interconnects between server chassis and/or ToR switches, interconnects between server racks, and finally interconnects between data centers. Generally, the communication bandwidth between nodes is reduced as one moves farther down the hierarchy.

In addition to latencies corresponding to transfers across the interconnect links themselves (which is a function of the link bandwidth and length and switching speed), significant latencies result from operations performed at the interfaces to the interconnects and/or additional processing/required to prepare the data for transfer across various interconnect links in the interconnect hierarchy. These data transfer latencies collectively reduce the communication performance and therefore the performance of the overall HPC implementation, and may represent a significant portion of the total latency (processing and data transfer) for the compute nodes.

Another important aspect of HPC is the software architecture. Implementing software using 10's of thousands of compute nodes in a parallel manner requires a significantly different software architecture than that employed for conventional applications. In addition, specific software modules have been developed for using corresponding types of interconnects, such as software modules used for communicating over InfiniBand.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 10 is a table illustrating data transfer paths for data transfers between various endpoints on separate platforms;

DETAILED DESCRIPTION

Figure 1:
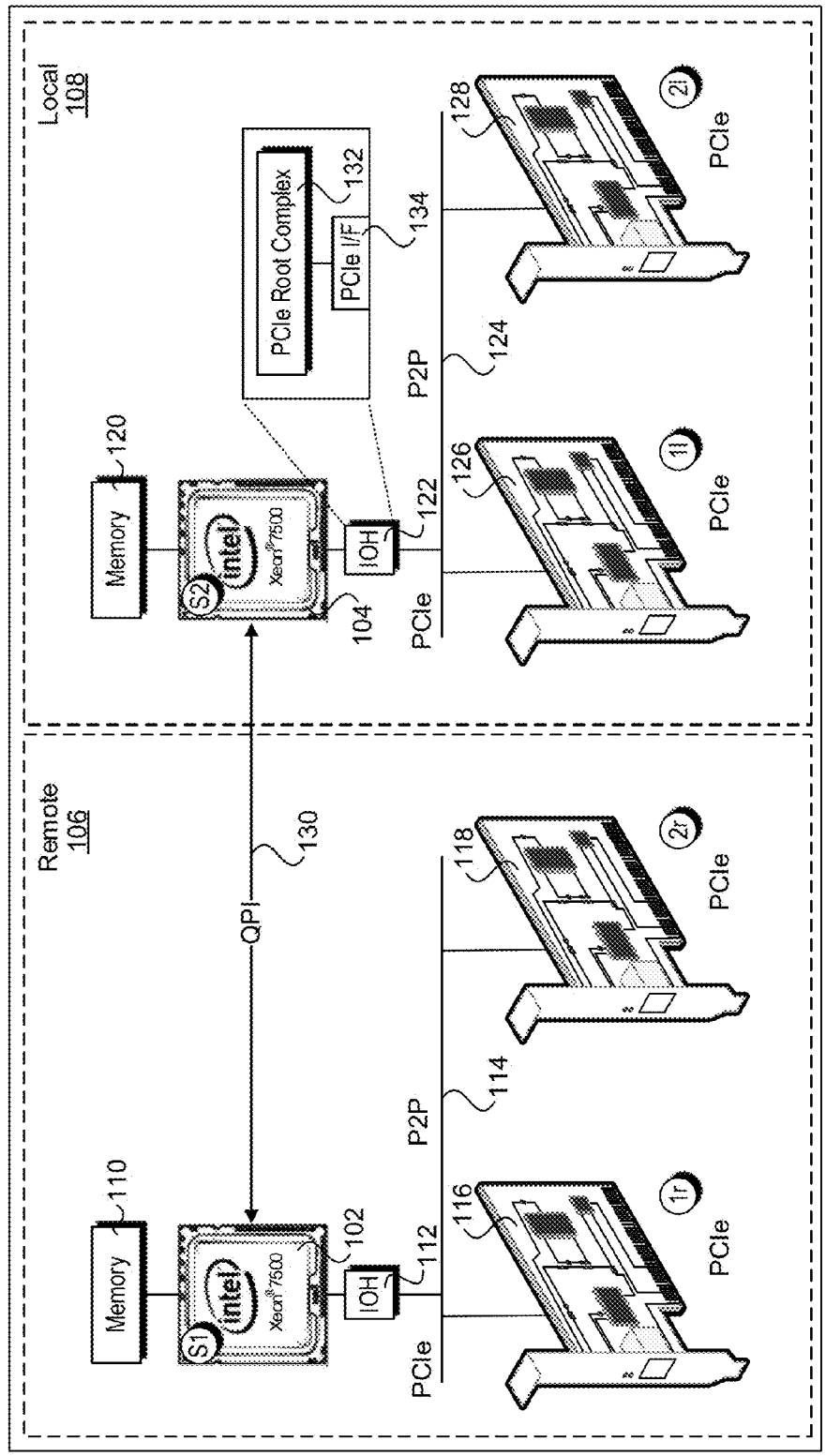
FIG. 1 is a schematic diagram of a 2-socket server platform including a local socket and a remote socket.

Embodiments of methods and apparatus to optimize network data flows within a constrained system are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 shows a server platform 100 having an architecture illustrating an example of a constrained system. The server includes two Intel® Xeon® processors (aka CPUs) 102 and 104, each associated with a separate "socket," depicted as a remote socket 106 and local socket 108. Each socket includes a set of components that are collectively operated as a separate server subsystem of server platform 100. For remote socket 106, the illustrated components include host memory 110, an input-output hub (IOH) 112, a PCIe (Peripheral Component Interconnect Express) interconnect 114, and a pair of PCIe cards 116 and 118. Similarly, for local socket 108, the illustrated components include host memory 120, an input-output hub (IOH) 122, a PCIe interconnect 124, and a pair of PCIe cards 126 and 128. As further shown in FIG. 1, processors 102 and 104 are connected via a QuickPath Interconnect® (QPI) link 130.

It is noted that the architecture shown in FIG. 1 and other Figures herein are exemplary, and specific components are merely representative of a type of more general component that may be implemented for a particular function, set of functions, or implementation. For example, the Xeon® processors are and IOH are represented of a generic CPU and IO subsystem.

A PCIe interconnect structure comprises a plurality of serial-based interconnects, which typically are implemented as multi-lane physical links; the lane width is identified by PCIe nx, where n is 1, 2, 4, 8, 16, or 32. PCIe evolved from the earlier PCI standard, which was implemented as a parallel bus structure. In some cases, the PCIe interconnect structure on a platform may be referred to as a PCIe bus, noting that the actual interconnect structure itself comprises point-to-point (multi-lane) links. For historical reasons, the logical hierarchy of a PCIe interconnect structure is depicted as a bus-like structure, since various aspects of PCIe operation, such as PCIe device enumeration, are inherited from similar operations under PCI.

As with PCI, a PCIe root complex sits at the top of a PCIe interconnect hierarchy. Depending on the architecture, one or more PCIe root complexes may reside in an IOH and/or in a processor employing a System on a Chip (SoC) architecture. In the configuration illustrated in FIG. 1, each of IOH 112 and 122 include a PCIe root complex 132 that is coupled to a PCIe interface (I/F) 134.

The PCIe root complex serves as a manager of devices connected to its physical interconnect structure, and as an interface between such devices and a host CPU. Most of today's computers and servers include one or more PCIe slots in which a corresponding PCIe card can be installed. Under some designs, each PCI slot has the same number of PCIe lanes, while in other designs the number of PCIe lanes for the slots may differ, such as using a wider interconnect for higher speed peripherals such as graphics cards and network adapters.

During boot-up, each PCIe root complex will perform testing to see which devices are present in its associated PCIe slots, and enumerate these devices. Generally, a PCIe interconnect hierarchy may support connections to other devices besides PCIe cards, such as various chips and interfaces mounted to a server's main board or another board coupled to the main board. These devices are enumerated, as well. In FIG. 1, PCIe cards 116 and 118 are enumerated as PCIe devices 1 and 2, with an appended 'r' to indicate these are PCIe devices 1 and 2 on remote socket 106. Similarly, PCIe cards 126 and 128 are enumerated as devices 1 and 2 on local socket 108 (and thus labeled 1*l* and 2*l*).

Generally, most communications over a PCIe interconnect relate to data transfers between a CPU and a PCI device, such as a PCIe card or peripheral. For example, suppose an application desires to send data (e.g., a memory block) to another server platform via a computer network, and that PCIe card 128 is a network adapter card, such as an Ethernet card. Typically, the application in connection with applicable networking stack software running on processor 104 would generate a stream of data packets containing the file data and buffered in host memory 120, and send the data packets via PCIe writes to PCIe card 128, which would then deliver the packets via the network to the other server platform. More advanced network adapters may also be implemented to support Direct Memory Access (DMA) reads and writes, which involves less processor overhead and facilitates even higher data transfer rates.

Under the foregoing CPU to PCIe endpoint (e.g., PCIe card 128) transfer, the transfer rate is generally limited to the bandwidth of the PCIe interconnect 124 reduced by latencies due to competing PCIe transactions on the interconnect. Under PCIe 3.0, the maximum bandwidth is 985 MB/s per lane, with an 8-lane (8×) interconnect supporting a bandwidth of approximately 8 GB/s, and a 16-lane (16×) interconnect supporting a bandwidth of approximately 16 GB/s.

Another feature of PCIe is support for peer-to-peer (P2P) communication that allows direct communication between PCIe devices and facilitated by the PCIe root complex, without involving the CPU's processor cores. For example, P2P PCIe data transfers may be employed to enable read and write data transfers between PCIe cards/device within the same PCIe interconnect hierarchy, such as between PCIe cards 126 and 128 on local socket 108 and between PCIe cards 116 and 118 on remote socket 106.

The use of IOHs originated in the well-known North-Bridge/South-Bridge computer system architecture, with an IOH corresponding to the South-Bridge. Since P2P data transfers have historically been uncommon, there has been little motivation to modify existing IOH designs to facilitate higher P2P transfer rates. As a result, P2P reads between PCIe devices are constrained to approximately 1 GB/s, while PCIe writes are not constrained. Data transfers between PCIe devices on separate sockets using P2P techniques are constrained for both PCIe writes and reads to approximately 300 MB/s. These constraints result in the lack of processing capability provided by the PCIe root complex architecture, rather than the PCIe interconnect and PCIe interfaces.

Recently, Intel® introduced its line of Xeon Phi™ Co-processors, which include a processor with many integrated cores implemented on a PCIe card. This class of device is referred to herein as a many integrated core device, or simply a MIC. In one embodiment, a MIC includes approximately 60 cores, with future generation Xeon Phi™ Co-processors projected to include upwards of 100 cores and beyond.

The MIC architecture enables a single server platform to support a large number of compute processing cores, particularly when multiple MICs are installed in the same platform. This is highly advantageous for HPC environments, particularly where the processing tasks involve a high-degree of locality and parallelism. As stated above, the interconnects with the least latency are those in the processors, since they combine very-high bandwidth and very short lengths. As a result, communication between compute cores in an MIC involves very low latencies, which is ideal for HPC.

However, there is still a need to transfer data between compute cores in a MIC and other compute nodes, both within and external to the server platform hosting the MIC. Techniques for transferring data between compute nodes in separate platforms are generally well-optimized in consideration of the available hardware and costs considerations. For example, network adaptors with corresponding DMA transfer facilities are commonly used in HPC and other server environments. The use of PCIe-based coprocessors, e.g., GPGPUs and MICs, adds a bit more complexity, since the compute nodes comprise cores in the MIC's processor rather than a socket CPU. Accordingly, the MICs include provisions for interfacing with networking equipment on the platform such as Ethernet adaptors and InfiniBand Host Controller Adapters (HCAs). Notably absent are optimizations in the PCIe architecture for exchanging data between PCIe devices such as MICs within the same platform. As discussed above, the conventional PCIe P2P data transfer facilities have significant performance deficiencies. This represents a serious performance hit for HCA server platforms that implement multiple PCIe cards, such as MICs and IB HCAs, resulting in constrained systems.

In accordance with the embodiments described herein, techniques and principles are disclosed for optimizing data flows within constrained systems, such as between PCIe-based MICs within the same server platform. While technologies such as PCIe peer-to-peer communication support direct communication into and out of a PCIe card's memory (such as that used in a PCIe-attached MIC), there are sometimes higher-bandwidth paths available through the platform. The embodiments provide a dynamic means to selectively exploit these higher-bandwidth paths on a per queue-pair or per-connection basis. The use of alternate paths delivers higher application performance without burdening application developers with the details of selecting specific data paths.

The selection and use of alternate paths is done in a way that is transparent to application software, giving the embodiments broad utility across multiple clients, including a variety of Message Passing Interface implementations (including but not limited to Intel's MPI Library, OpenMPI, and MVAPICH2). In cases where the alternate paths provide substantially higher performance than P2P, the embodiments yield substantially higher application-level performance.

Figure 2:
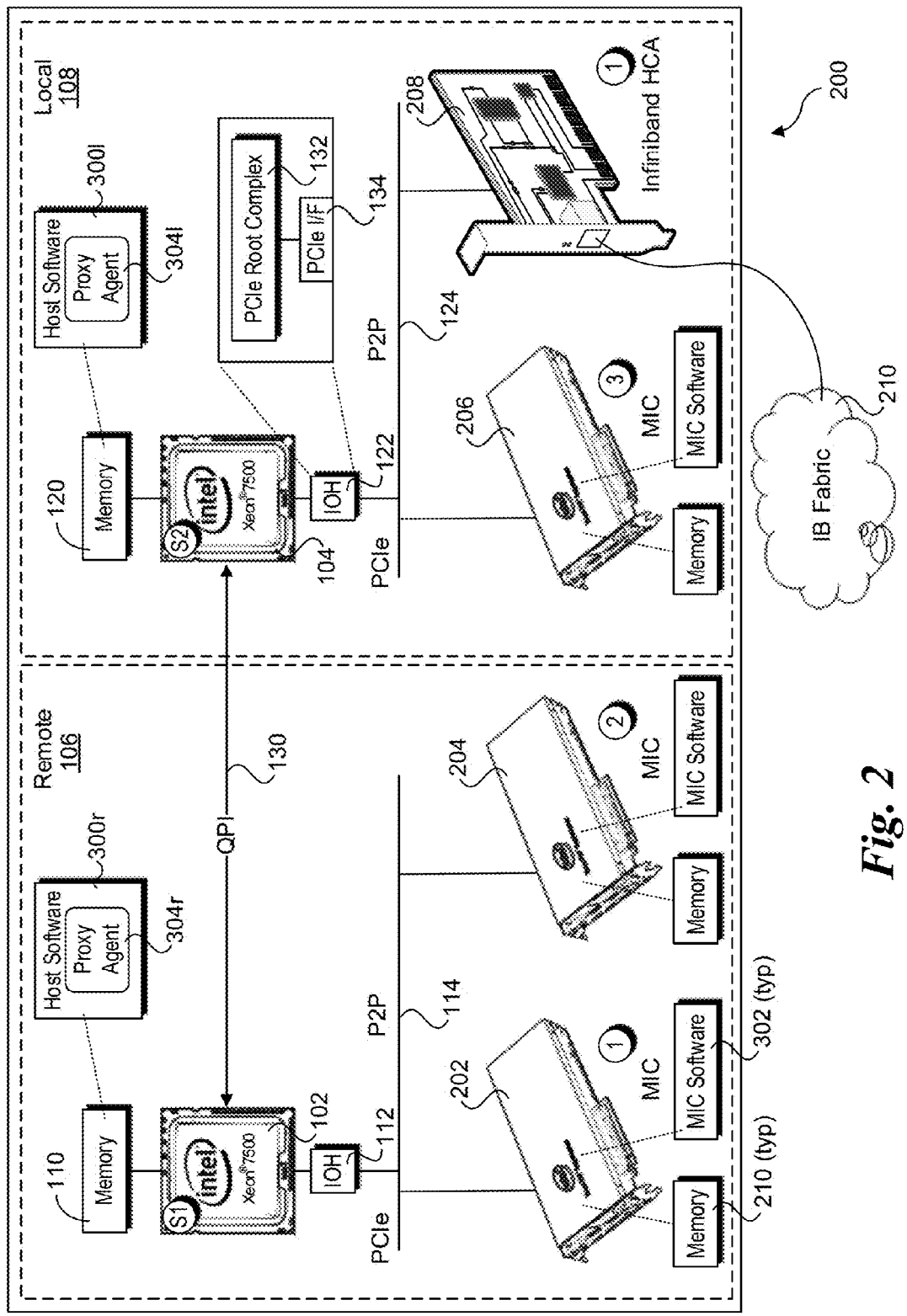
FIG. 2 is a schematic diagram of a 2-socket server that is configured to implement data transfers using proxied data paths.

FIG. 2 shows a server platform 200 illustrating an exemplary environment in which the foregoing components may be implemented. The general architecture is similar to server platform 100 of FIG. 1, wherein components with similar reference numbers in these two figures are configured in a similar manner. In server platform 200, the PCIe cards now include three MICs 202, 204 and 206, and an InfiniBand HCA 208 that is coupled to an InfiniBand (IB) fabric 210. These PCIe cards are respectively enumerated as MICs 1, 2, 3, and IB HCA 1, as shown. This enumeration is separate from the PCIe interconnect enumeration for each of the remote and local sockets 106 and 108 described above; rather it is employed by the system agents to identify the MIC instances and the IB HCA instance or instances (in server platforms employing multiple IB HCAs). Each of these MICs includes memory 210 and MIC software 302, which is executed on one or more cores of the MICs many-core processor (not shown). Each of processors 102 and 104 executes an instance of host software 300 including a user-level Direct Access Provider Library (uDAPL) proxy agent 304, which is loaded into user space in memories 110 and 120, respectively.

Figure 3:
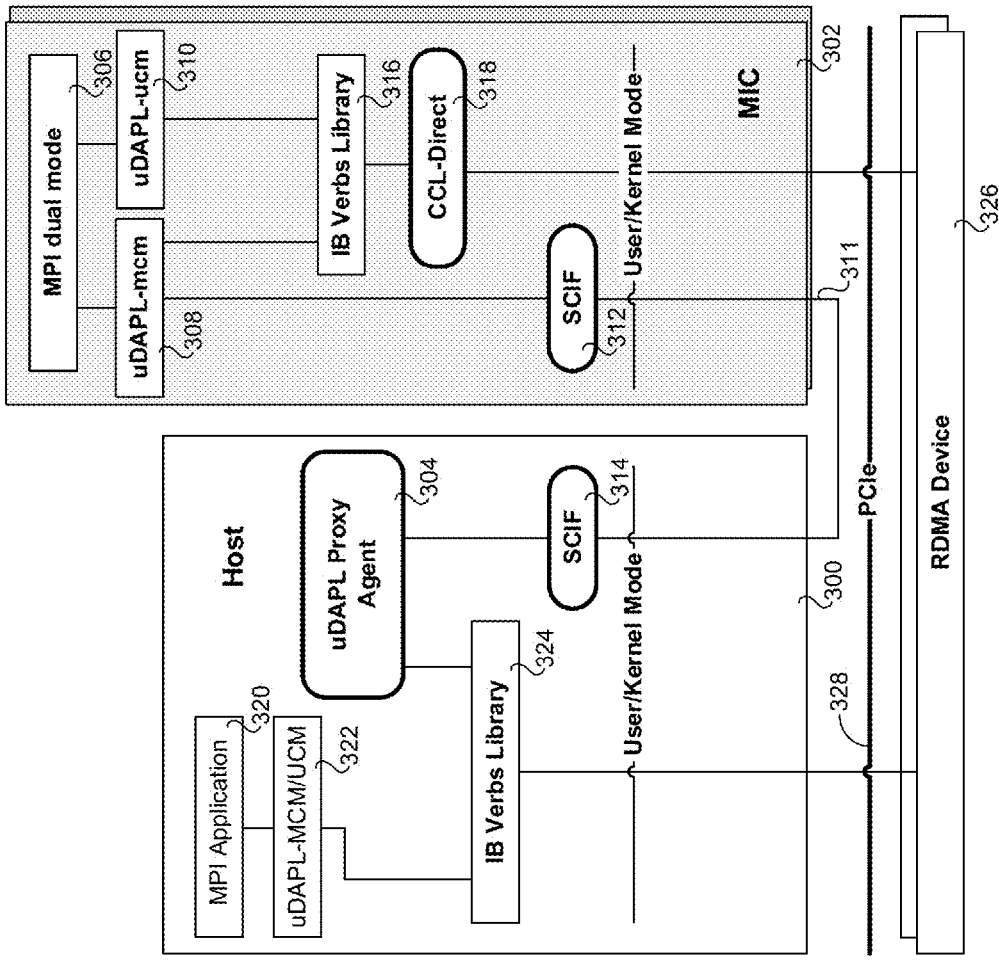
FIG. 3 is a schematic diagram illustrating software components implemented in a host and MIC to implement proxied data transfers, according to one embodiment.

FIG. 3 illustrates further details of host software 300 and MIC software 302, according to one embodiment. MIC software 302 includes a Message Passing Interface (MPI) dual mode interface 306 to which a pair of Open Fabrics Enterprise Distribution (OFED) uDAPL provider clients, including a MIC Connection Manager (uDAPL-mcm) provider client 308 and a user Connection Manager (uDAPL-ucm) provider client 310, are connected. uDAPL-mcm provider client 308 pipelines data from the MIC to host memory by sending the data to uDAPL proxy agent 304 using a Symmetric Communications Interface (SCIF) connection 311, which is facilitated by a SCIF 312 interface in MIC software 302 and a corresponding SCIF 314 interface in host software 300. MIC software 302 further includes an IB verbs library 316 and a CCL-Direct module 318 that is used to support direct Coprocessor Communication Link (CCL-Direct) communication between MICs. Host software 300 further includes an MPI application 320, an uDAPL-MCM/UCM module 322, and an IB verbs library 324. As further shown, each of IB verbs library 324 and CCL-direct module 318 supports communication with an RDMA device 326 over a PCIe interconnect 328.

Core aspects of the embodiments include a set of "shadow" queue pairs and a new wire-protocol to connect and use multi-hop data paths inside and outside of the platform using associated agents. These new components interact in a way such that the source of network operations can be dynamically selected, yet the sink of those operations cannot distinguish the various sources. In a similar fashion, the requestor of the network operation (typically an RDMA send or write) makes the request of a specific source queue, while the implementation may choose to select an alternate source queue to fulfill the request.

In one embodiment, the system consists of the following components:
 1) Queue pairs (QP) or other connections between two communicating process endpoints. At least one queue resides on a PCIe card, such as a MIC.
 2) For each queue that resides on a PCIe card, a shadow queue pair where one queue resides on the corresponding host and the other queue is co-resident with the remote queue. The host-based queue is known as the shadow queue.
 3) Pairs of command, connection, and data agents which are co-resident with the two endpoints of each shadow queue pair.

When a client of a queue in QP (1) above posts an RDMA Write work queue entry WQE, the local agent compares the request to a list of rules and determines whether to post the WQE to the local queue or to send it to its peer agent (3) managing the shadow queue (2). In the latter case, the local agent passes the WQE to the peer agent via the new command channel (3) to a peer data mover agent (the proxy agent). The peer agent uses a pre-existing communication channel (e.g., RDMA-based or otherwise) to transfer a portion of the message payload to host-based scratch buffers. It then posts a modified WQE to the local shadow queue, which initiates transfer of this message fragment. The peer agent then alternately transfers message fragments from PCIe card memory to host scratch buffers and posts appropriate WQEs to effect the transfer. The peer agent may use a double buffering scheme to improve overall throughput while hiding PCIe card-to-host latency. When the original message payload specified in the original WQE is fully transferred, the host-based peer agent will notify the PCIe card-based agent, which will post an appropriate entry to the QPs completion queue (CQE).

This application of establishing and using split communication channels with multi-located endpoints provides advantages over existing approaches. Under the embodiments herein, transmit and receive channels take different paths with uniquely located endpoints for optimal data flow based on the source and sink capabilities. This is achieved by selecting and utilizing multiple high-performance paths through the server rather than a single, slower path. In addition, each path can introduce a proxy agent into the channel in order to assist with data rates. For example, proxied data transfers have no P2P limitation with HOST to MIC or with HOST to HCA, thus enabling transfer rates approaching IB QDR (quad data rate)/FDR (fourteen data rate) wires speeds. The buffered, fragmented transmission of a single larger payload under a standard communication channel (SCIF in one embodiment) and in a means transparent to the communication client represents a novel approach with substantial performance advantages over existing approaches.

A connection mechanism for both multi-directional and multi-location endpoints is also provided. This is implemented in some embodiments via use of a new Connection Management (CM) wire protocol (over IB fabric) to handle discovery, setup of channels, and placement of endpoint and proxy agents. In addition, there is a new operation channel protocol (SCIF in one embodiment) that provides proxy client to proxy server agent support for management, CM, and RDMA write operations. In this case, P2P platform read issues limit data rates to 1 GB/s, so it is preferable to avoid HCA reads from a MIC on the source side and use a proxy agent for RDMA write operations. For the sink side, the HCA is doing P2P writes to the MIC and it is not limited, so a proxy agent is not set up on receiving side of the channel.

Figure 4:
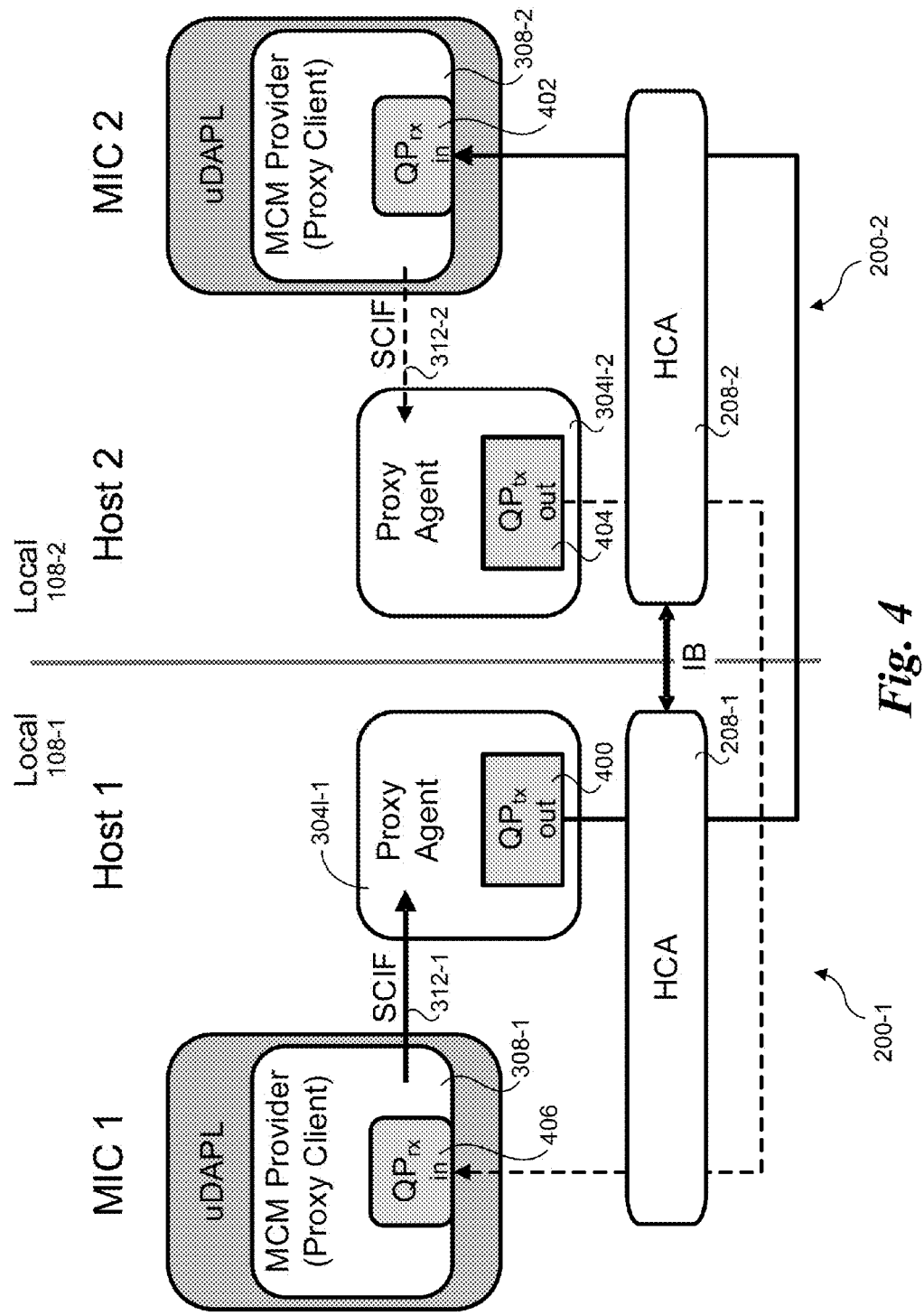
FIG. 4 is a diagram illustrating components and Queue Pairs for implementing a proxied data transfer, according to one embodiment.

FIG. 4 shows the basic structure of data flows between two local MIC endpoints MIC 1 and MIC 2 on respective server platforms 200-1 and 200-2. As used in the drawings herein, physical queue pairs (QP) are shown with a white background, while shadow QPs are shown with a gray background. Also, a receive half of a queue pair is labeled as $QP_{rx}$, while a transmit half of the queue pair is labeled as $QP_{tx}$.

During a setup process, buffer spaces for the shadow QPs are allocated, as follows. For transfers from MIC 1 to MIC 2, a transmit shadow queue 400 is allocated in the local host (Host 1), while a shadow QP receive queue 402 is allocated for uDAPL MCM provider client 308-2, which is hosted by software in the remote MIC. Similarly, for transfers from MIC 2 to MIC 1, a transmit shadow queue 404 is allocated in the local host (Host 2), while a shadow QP receive queue 406 is allocated for uDAPL MCM provider client 308-1.

The data flow from MIC 1 to MIC 2 proceeds as follows. uDAPL MCM provider client 308-1 transfers data to proxy agent 3041-1 via a SCIF link 312-1, where it is buffered in shadow transmit queue 400 that is used as an output queue. As described below, in one embodiment data transfers are fragmented under which a given data transfer comprises transfer of one or more data fragments. The data is transferred from shadow transmit queue 400 to HCA 208-1. The data is encapsulated in IB packets, sent out onto the IB fabric, and received at HCA 208-2 on platform 200-2. At this point a direct HCA-to-MIC transfer is made using a PCIe P2P write, with the data being received at MCM provider client 308-2 at shadow QP receive queue 402.

Data transfers in the opposite direction (from MIC 2 to MIC 1) are performed in a similar manner. MCM provider client 308-2 transfers data to proxy agent 3041-2 via a SCIF link 312-2, where it is buffered in shadow transmit queue 404. Next, the data is transferred from shadow transmit queue 402 to HCA 208-2. The data is then encapsulated in IB packets, sent out onto the IB fabric, and received at HCA 208-1 on platform 200-1. A direct HCA-to-MIC transfer is then made using a PCIe P2P write, with the data being received at MCM provider client 308-2 at shadow QP receive queue 406.

Figure 5:
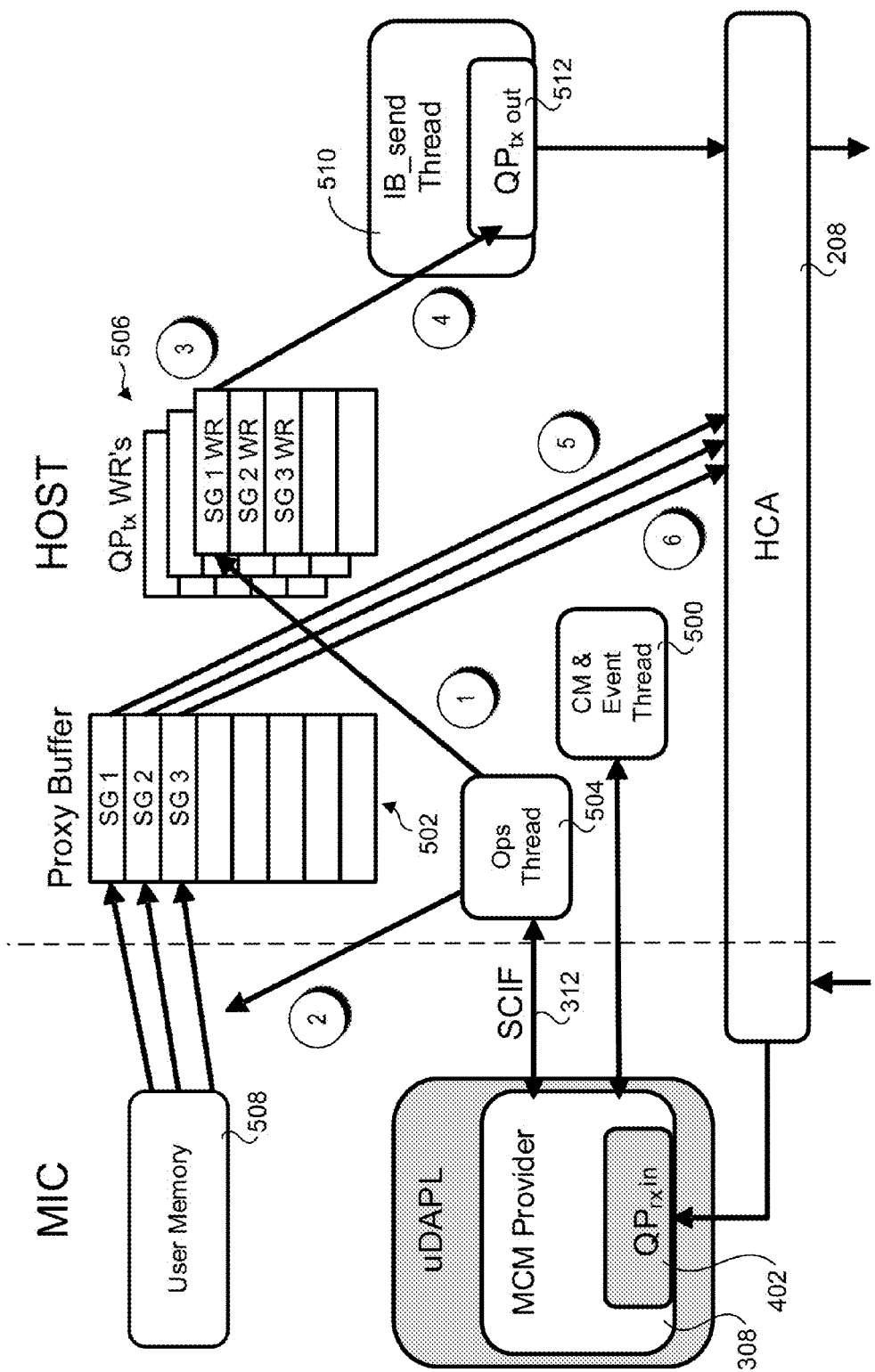
FIG. 5 is a diagram illustrating the interactions between components on the source side of a transfer to implement a proxied RDMA data transfer using multiple data fragments, according to one embodiment.

FIG. 5 is a diagram showing (source side only) an example of how data is fragmented and moved via a proxy agent for a standard RDMA write command. At this stage, the new CM protocol has already discovered and set up optimal split data channels with a MIC-HOST proxy agent on the source and a direct channel to MIC on the sink side; these operations are facilitated by a CM & Event thread 500. During a standard device open and subsequent QP create call a proxy buffer 502 and shadow QP resources are allocated and pre-registered with both SCIF and IB. There is flow control mechanism built in with this embodiment's operation protocol for both proxy buffer and $QP_{tx}$ resources.

Figure 6:
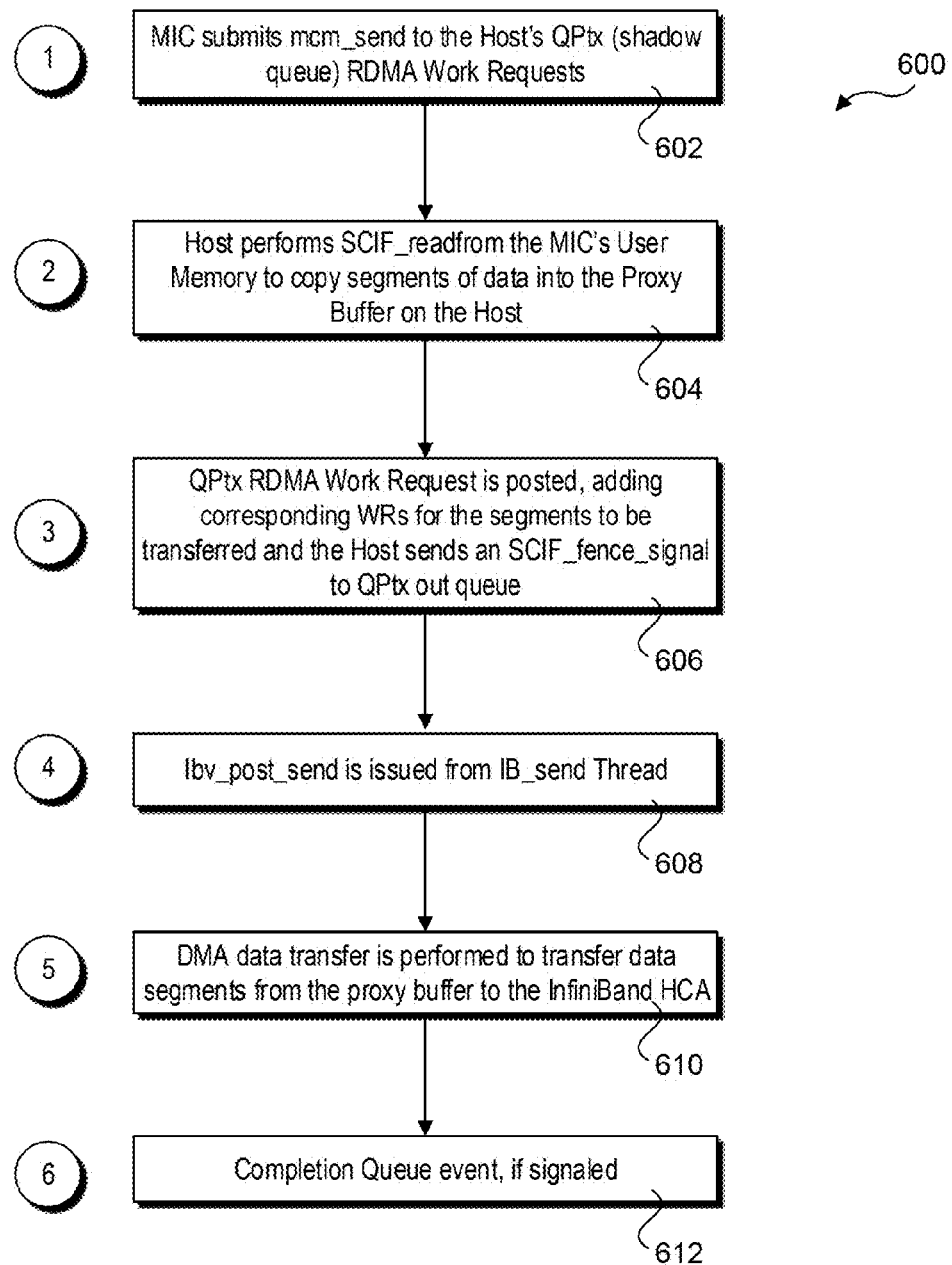
FIG. 6 is a flowchart illustrating operations performed to implement the RDMA data transfer of FIG. 5

With further reference to the flowchart 600 of FIG. 6, the data transfer process proceeds as follows. These operations are facilitated, in part, via Ops thread 504. First, in a block 602, for RDMA writes, the standard post_send call on the MIC is forwarded to the host's $QP_{tx}$ shadow queue (implemented in proxy buffer 502) via an mcm_send operation over the SCIF channel. Based on the size of data transfer, this will setup a proper segment size and use optimal operation channel DMA mechanisms. It will also set up corresponding segment work requests, which are added to the transmit shadow queues WRs 506. Next, in block 604, the host performs a SCIF_readfrom the MIC's user memory 508 to copy segments of data into proxy buffer 502 on the host. Upon completion of the first segment it will send this segment directly to a sink buffer 510 using the original address and rkey from the application. In a block 606, the host sends a SCIF_fence_signal to a $QP_{tx}$ transmit queue 512 in sink buffer 508. An ibv_post send is then issued from the IB_send thread in a block 608, and a corresponding DMA data transfer is performed to transfer the data segments from the $QP_{tx}$ transmit queue 512 to IB HCA 208. When the data transfer to the remote sink is completed for each WRE, a completion queue (CQ) event may be enunciated (if signaled) in a block 612. In response to detection of the CQ, corresponding proxy buffer and WR resources are freed. Similarly, in one embodiment, when data is transferred from the MIC to the proxy, the MIC can be signaled, enabling the application to reuse the send buffer.

Figure 7A:
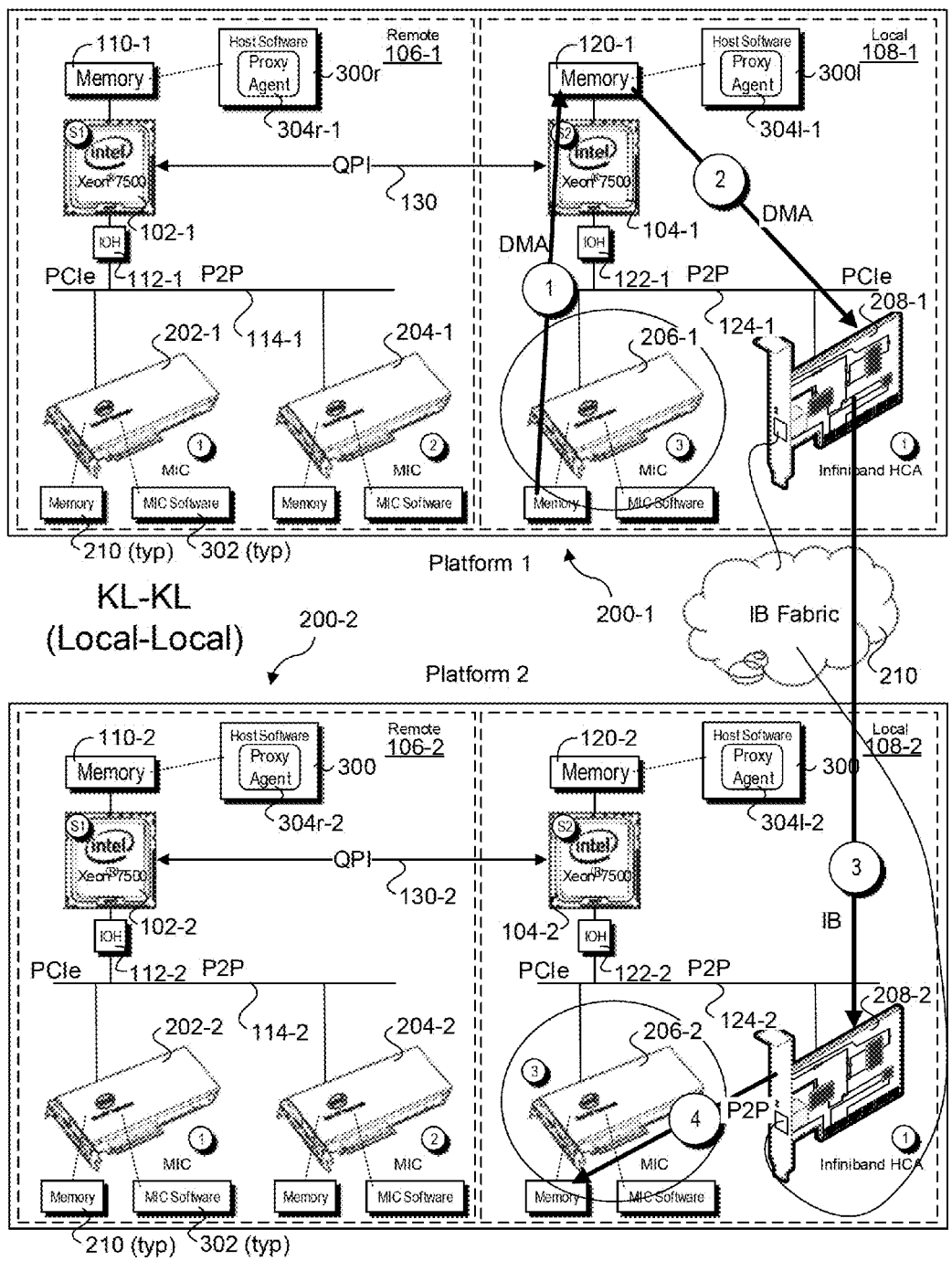
FIGS. 7a and 7b are schematic diagrams illustrating an implementation of a local-to-local data transfer between a pair of 2-socket server platforms; according to one embodiment.
Figure 7B:
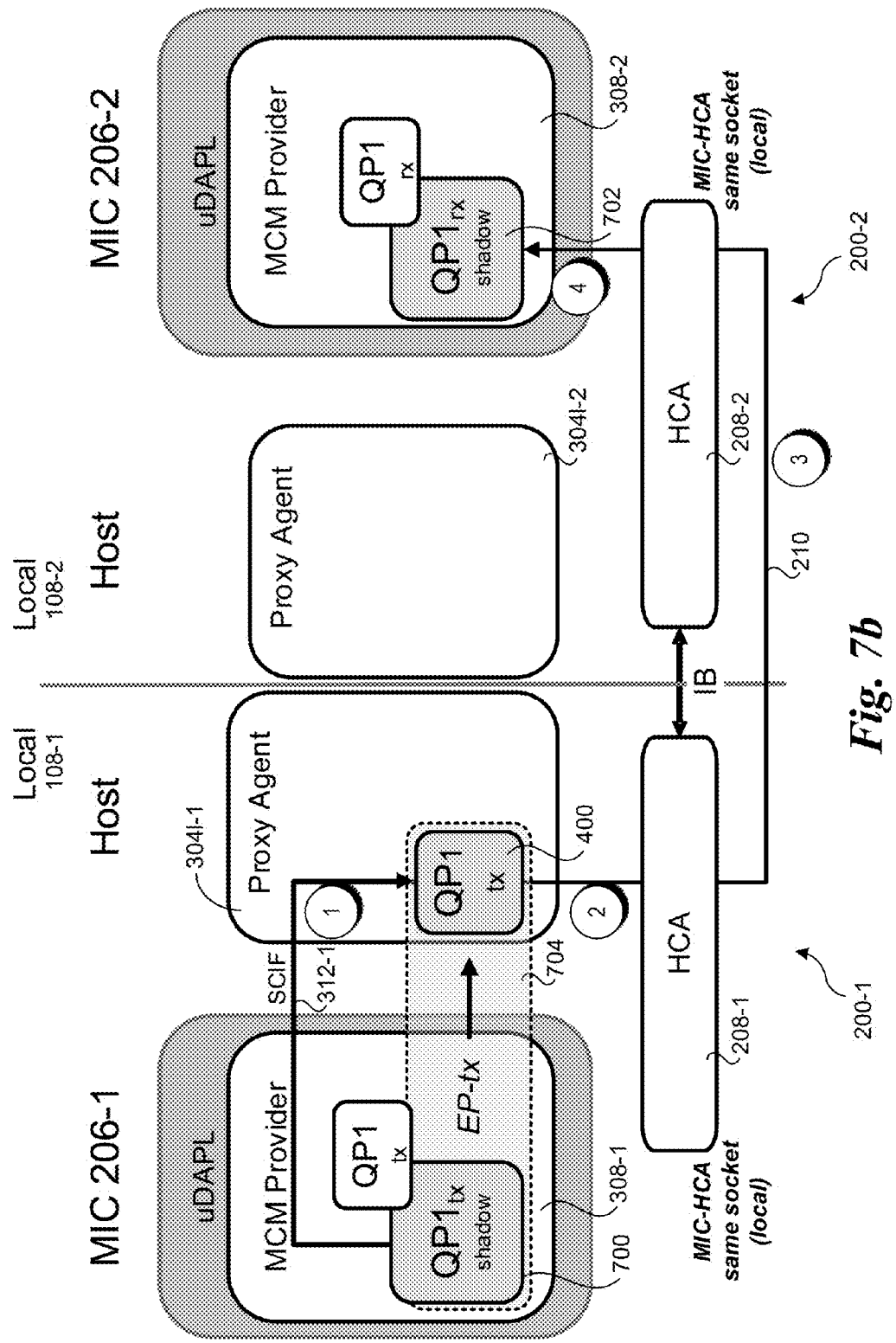

FIG. 7a shows a schematic depiction of a data transfer from a MIC 206-1 on platform 200-1 to a MIC 206-2 on platform 200-2. Both MIC 206-1 and 206-2 are local to their respective IB HCA cards 208-1 and 208-2 and are attached to the same PCI buses as the IB HCA cards. Accordingly, this is a local-to-local transfer, also referred to herein as a KL-KL transfer. Corresponding details of the buffers and associated software clients and agents for a KL-KL transfer are shown in FIG. 7b.

At the illustrated level, the data transfer from MIC 206-1 to MIC 206-2 involves four transfers. However, those skilled in the art will recognize that the illustrated transfers may involve additional buffering, which is not shown for clarity and ease of understanding. Each of the transfers is identified by an encircled number (e.g., 1, 2, 3, and 4 in FIGS. 7a and 7b). Transfer '1' depicts a transfer from a memory buffer on MIC 206-1 to host memory 120-1 on local socket 108-1 (Host 1). As discussed above with reference to FIGS. 4 and 5, this is a data proxy operation that copies data from a transmit buffer 700 in MCM provider 308-1 to shadow transmit queue 400 in host memory 120-1 that is associated with proxy agent 304*l*-1. In the illustrated embodiment this is a DMA write from MMIO address space on MIC 206-1 into host memory 120-1 that is transferred over PCIe interconnect 124-1 via IOH 122-1 and using SCIF. This is also depicted as a proxied data transmission 704 from the source endpoint (MIC 206-1) to QP1 shadow transmit queue 400.

Transfer '2' comprises another DMA transfer from host memory 120-1 to IB HCA 208-1. In further detail, data is transferred from shadow transfer queue 400 to a transmit buffer in IB HCA card 208-1. The DMA transfer comprises a memory read and then a PCI write to MMIO on IB HCA card 208. Accordingly, the physical data path is from host memory 120-1 via processor 104-1 to IOH 122-1, and then via PCIe interconnect 124-1 to IB HCA card 208-1.

Transfer '3' is a conventional InfiniBand data transfer between two IB endpoints (IB HCA cards 208-1 and 208-2) connected to IB fabric 210. One or more data fragments are buffered at the sending IB endpoint (IB HCA card 208-1) and corresponding data is transferred to the receiving IB endpoint (IB HCA card 208-2) via one or more IB packets.

The data transfer from MIC 206-1 to MIC 206-2 is completed via a P2P transfer over PCIe interconnect 124-2 from IB HCA card 208-2 to MIC 206-2, as depicted by a transfer '4'. Depending on the size of the transfer, this may be accomplished by one or more PCIe P2P writes. In one embodiment the direct P2P transfers use CCL-Direct transfers. As shown in FIG. 7*b*, the data transferred from IB HCA card 208-2 to shadow receive queue 702, the peer queue of shadow transmit queue 400.

Figure 8A:
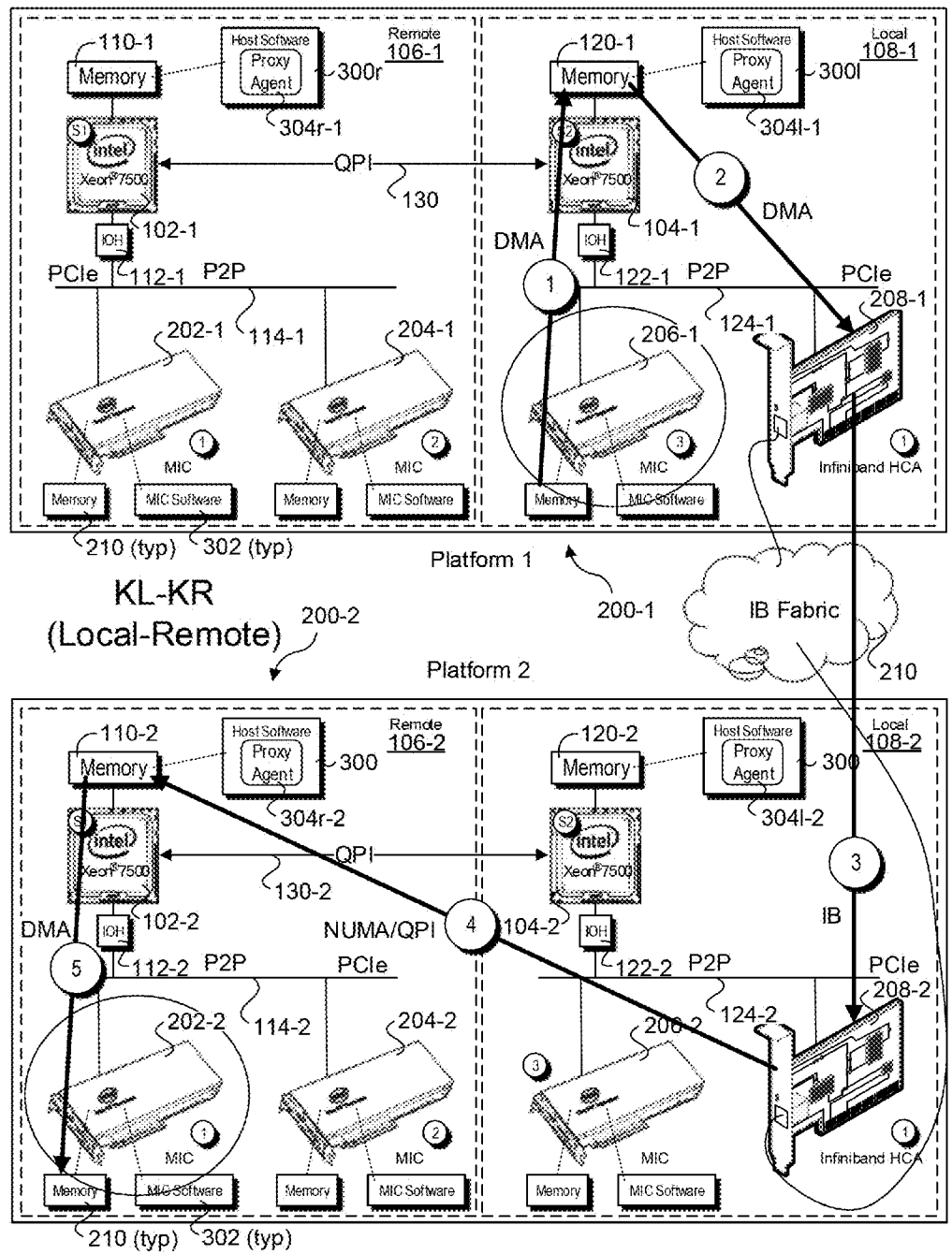
FIGS. 8a and 8b are schematic diagrams illustrating an implementation of a local-to-remote data transfer between a pair of 2-socket server platforms; according to one embodiment.
Figure 8B:
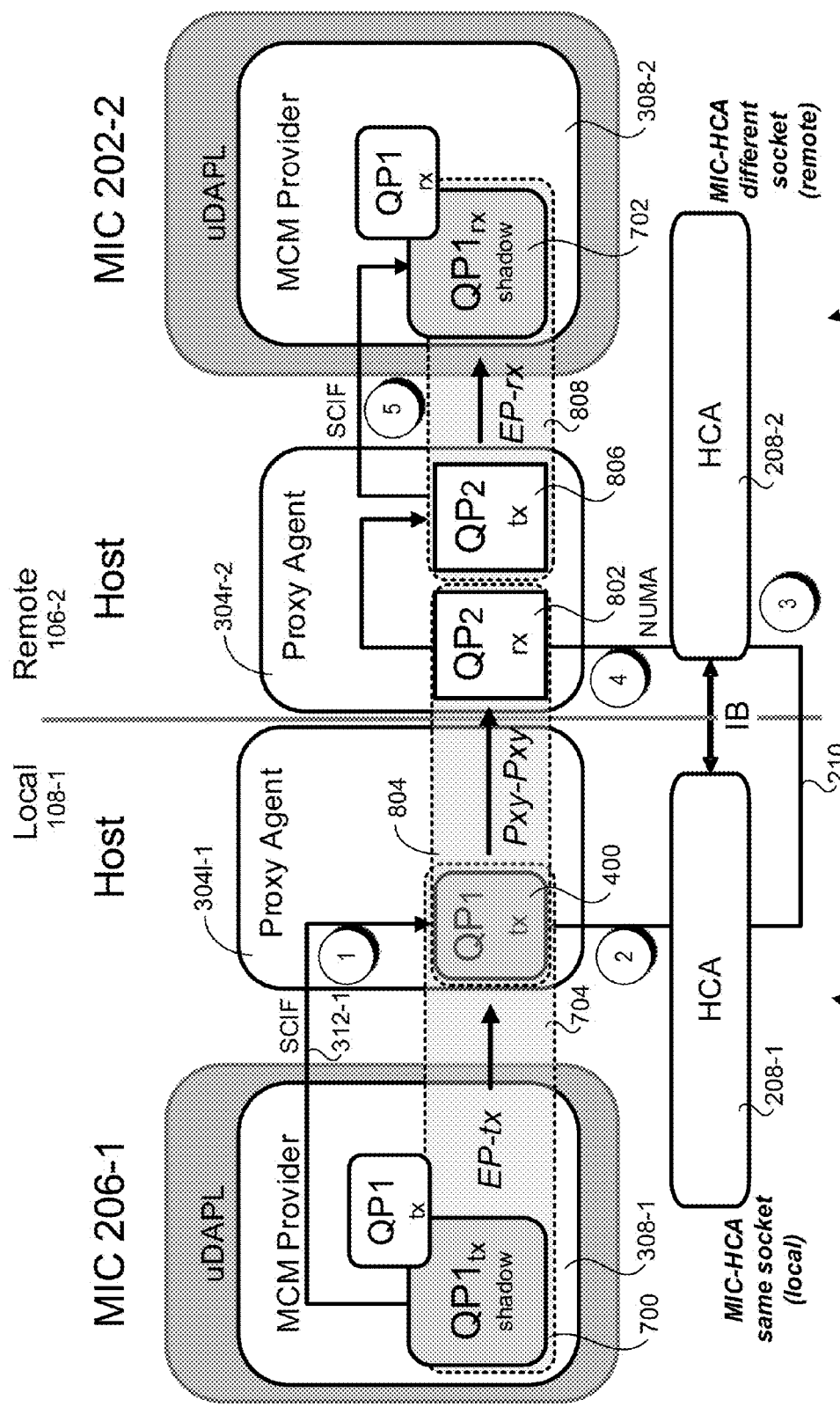

FIGS. 8*a* and 8*b* illustrate an example of a local to remote data transfer (KL-KR) from MIC 206-1 to MIC 202-2. The first three transfers are the same as shown in FIGS. 7*a* and 7*b* and described above, at which point the transferred data is received by IB HCA 208-2. At this point, there is Non-Uniform Memory Access (NUMA) data transfer from IB HCA 208-2 to a QP2 receive queue 802 in memory 110-2, as depicted as a transfer '4'. This is also depicted as a proxy-to-proxy transfer 804. Under a NUMA architecture, such as employed by 2-socket platforms 200-1 and 200-2, each socket is enabled to access is own local memory and access remote memory on another socket using two different (and thus non-uniform) memory access mechanisms.

Under one embodiment, the NUMA data transfer from IB HCA 208-2 to memory 110-2 proceeds as follows. During platform initialization or otherwise prior to data transfers via IB HCAs, various Memory-Mapped IO (MMIO) address spaces are allocated for the IB HCAs, as well as other PCIe devices, such as the MICs. For a NUMA configuration, there is MMIO address space allocated from both sockets. The data transfer is a PCIe transaction comprising transfer of one or more PCIe packets that identifies its destination endpoint via a corresponding MMIO address—in this instance a MMIO address in memory 110-2. As the PCIe packets are forwarded via the local PCIe interconnect to the local PCIe root complex, the destination address is examined by a PCIe agent or the like and identified as being on another socket not being accessible locally. Under the illustrated embodiment, there is a QPI socket-to-socket interconnect 130-2 for platform 200-2. QPI employs packet-based transactions using a multi-layer QPI protocol with source and destination QPI endpoints. Forwarding of the PCIe packets is handed off to a QPI agent or the like associated with processor 104-2, which encapsulates the PCIe packet or packets in one or more QPI packets, which are transferred via processor 104-2 to processor 102-2 via QPI interconnect 130-2. Upon receipt at the QPI destination, another QPI agent de-encapsulates the PCIe packet(s) and then the PCIe packets are forwarded to a PCIe agent associated with processor 102-2 that generates one or more memory write transactions to write the transferred data to memory 110-2 at the MMIO address identified by the PCIe transaction. In a manner similar to that shown in FIG. 4, in one embodiment, this data transfer may be performed using one or more fragments.

The result of the foregoing is data is transferred from IB HCA 208-2 to QP2 receive queue 802 in memory 110-2, as discussed above. The data is internally transferred from QP2 receive queue 802 to a QP2 transmit queue 806 by proxy agent 304*r*-2. In accordance with a transfer '5', data is then forwarded from QP2 transmit queue 806 to memory on MIC 202-2 via a DMA transfer. This is also depicted as a proxied endpoint receive transfer 804 to QP1 shadow receive queue 702 in the destination endpoint (MIC 202-2).

Figure 9A:
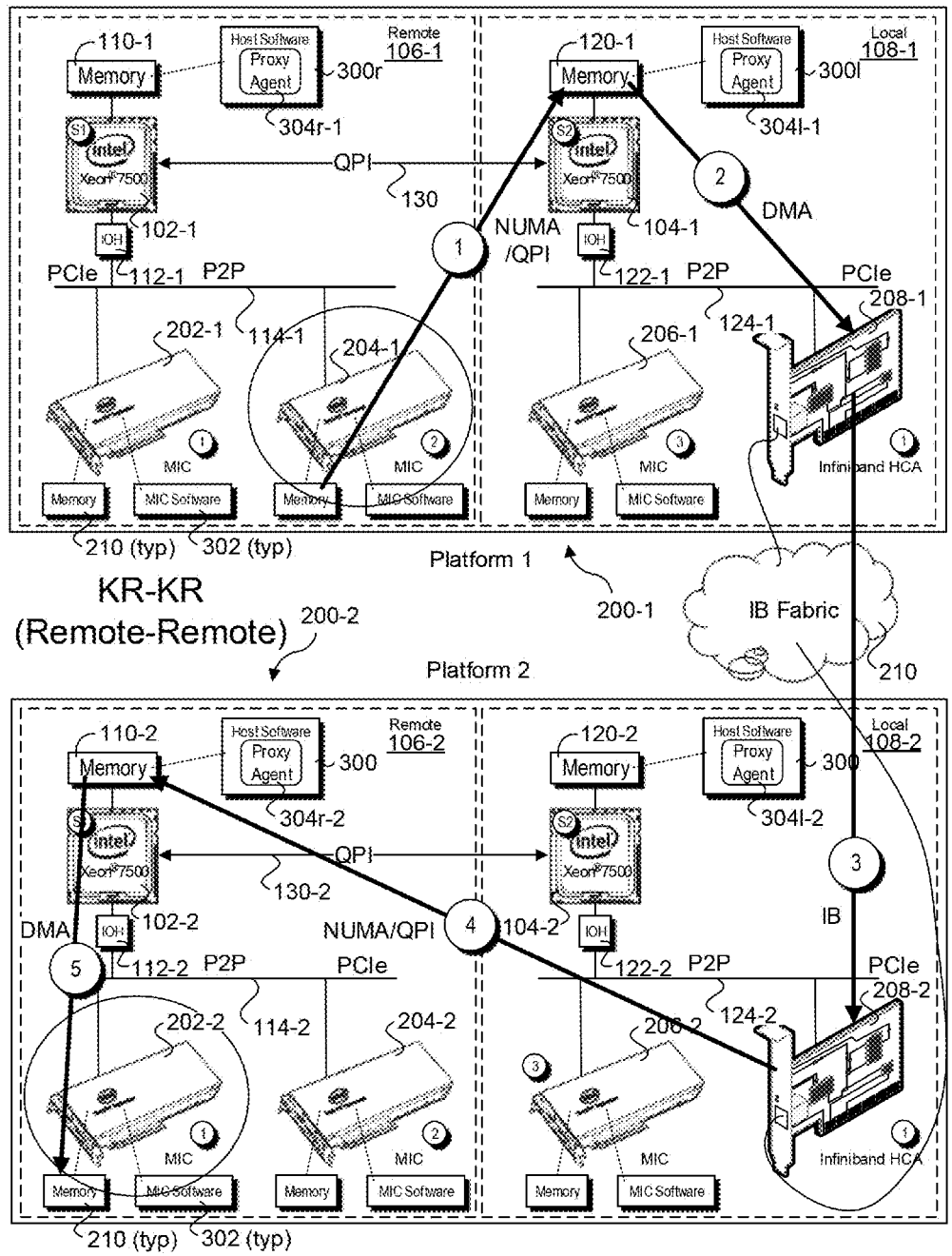
FIGS. 9a and 9b are schematic diagrams illustrating an implementation of a remote-to-remote data transfer between a pair of 2-socket server platforms; according to one embodiment.
Figure 9B:
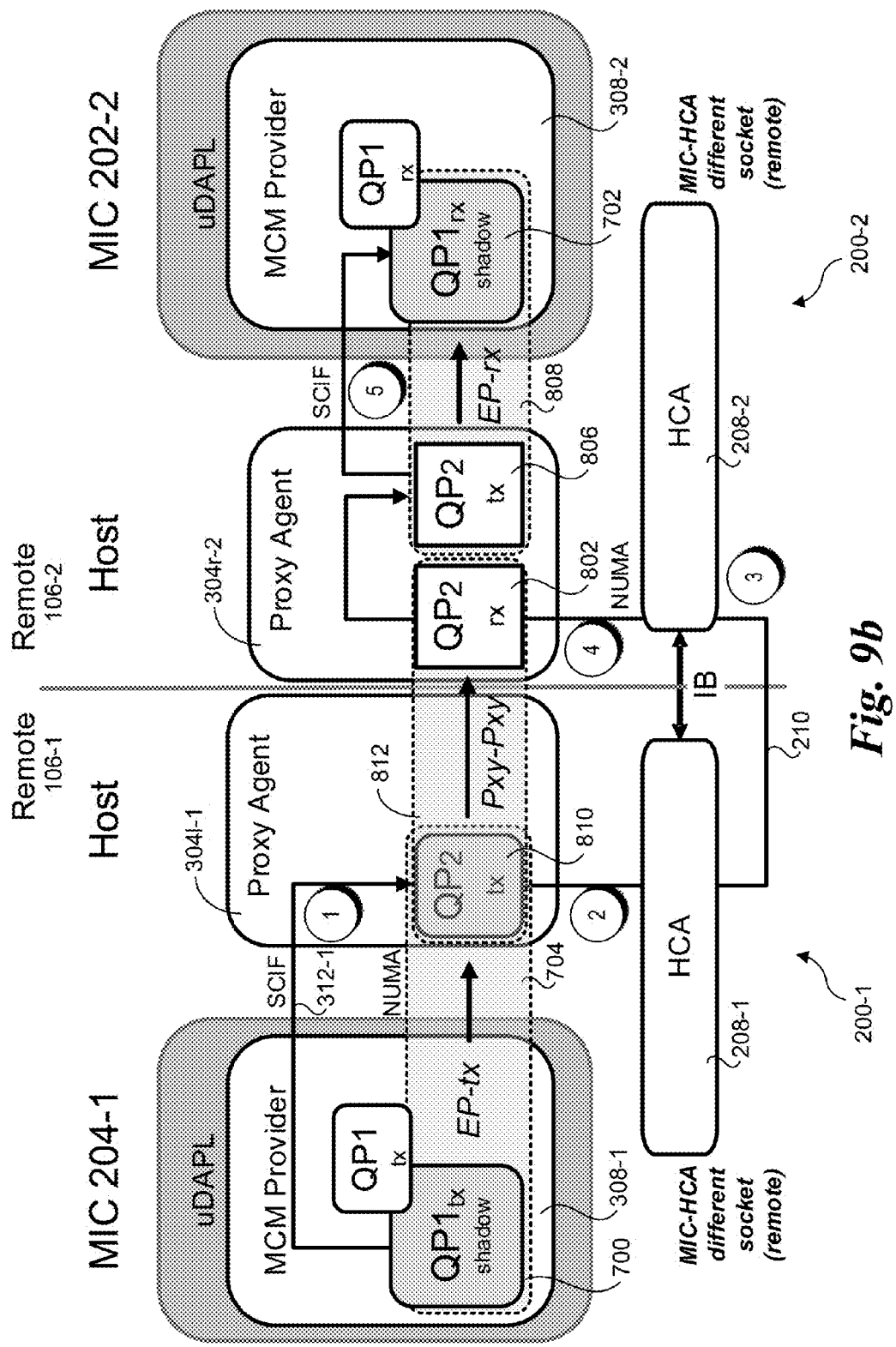

FIGS. 9*a* and 9*b* illustrate an example of a remote MIC-to-remote MIC transfer, also referred to as KR-KR. In this example, the transfer is from MIC 204-1 to MCI 202-2, which are both remote PCIe devices (relative to the local IB HCAs on platforms 200-1 and 200-2). Transfers '2'-'5' are the same as for the KL-KR transfer example of FIGS. 8*a* and 8*b*. In conjunction with a first transfer '1', MIC 204-1 transfers data to a QP2 shadow transmit queue 810 in memory 120-1. As before, this is performed via a NUMA memory write into a MMIO address space in memory 120-1 allocated for MIC 204-1. Transfers '2', '3', and '4' collectively facilitate a proxy-to-proxy transfer of data from data is transferred from QP2 shadow transmit queue 810 to QP2 shadow transmit queue 810 to QP2 receive queue in memory 110-2. The data transfer is completed in transfer '5', which is similar to transfer '5' in the KL-KR transfer of FIGS. 8*a* and 8*b*.

FIG. 10 shows a table 1000 listing various transfer combination between endpoints on different platforms facilitated by an IB fabric transfer between IB HCAs on the platforms (thus resulting in a transfer that is outside the server boxes). In addition to forward paths, table 1000 also list the reverse path for each type of transfer, wherein the reverse path is right-to-left rather than left-to-right.

Figure 11:
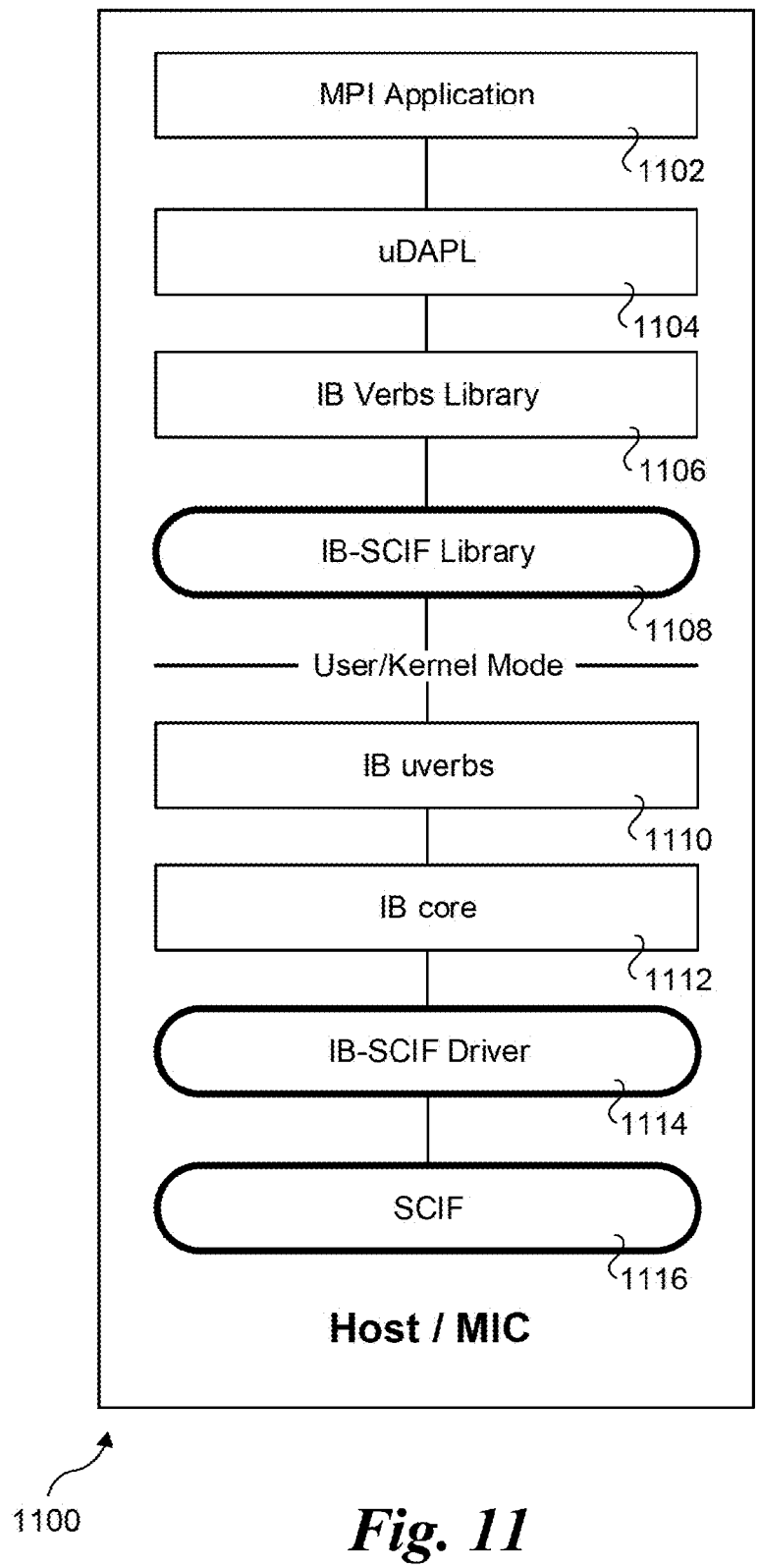
FIG. 11 is a diagram illustrating a software architecture for implementing RDMA over SCIF and InfiniBand, according to one embodiment.

FIG. 11 shows a software architecture 1100 for implementing RDMA over SCIF and InfiniBand, according to one embodiment. In FIG. 11, the components shown with bold outline are new components, which the remaining components correspond to existing components. The user space components include an MPI application 1102, a uDAPL module 1104, an IV verbs library 1106 and a new IB-SCIF library 1108. The kernel mode components include an IB uverbs module 1110, an IB core module 1112, a new IB-SCIF driver 1114, and a new SCIF module 1116.

In one embodiment, RDMA over SCIF/IB employs the core OFA software modules from the Open Fabrics Alliance, including IB verbs library 1106, IB uverbs module 1110, and IB core module 1112. IB-SCIF driver 1114 is a new hardware-specific driver and library that plugs into the OFED core mid-layer. SCIF is the lowest level communications driver between a PCIe device and a processor, such as between a MIC and a Xeon® processor. Architecture 1100 provides standard RDMA verbs interfaces within the platform. As discussed above, the various proxy operations discussed herein are performed in a manner that is transparent to the software applications running on the data transfer endpoints; from the software application's perspective, the proxied data transfers appear to be direct data transfers from a source endpoint to a destination endpoint.

Another feature of some embodiments is referred to as MPI dual DAPL. Under this feature, software operating in the transfer source endpoints intelligently selects whether to transfer data using direct PCIe CCL P2P datapaths or whether to use a proxied transfer. In one embodiment, small messages are sent using CCL direct path, while large messages are transferred using a CCL proxy path. This dual mode transfer feature enables MPI application to perform transfers with both low latency and high bandwidth.

Figure 12:
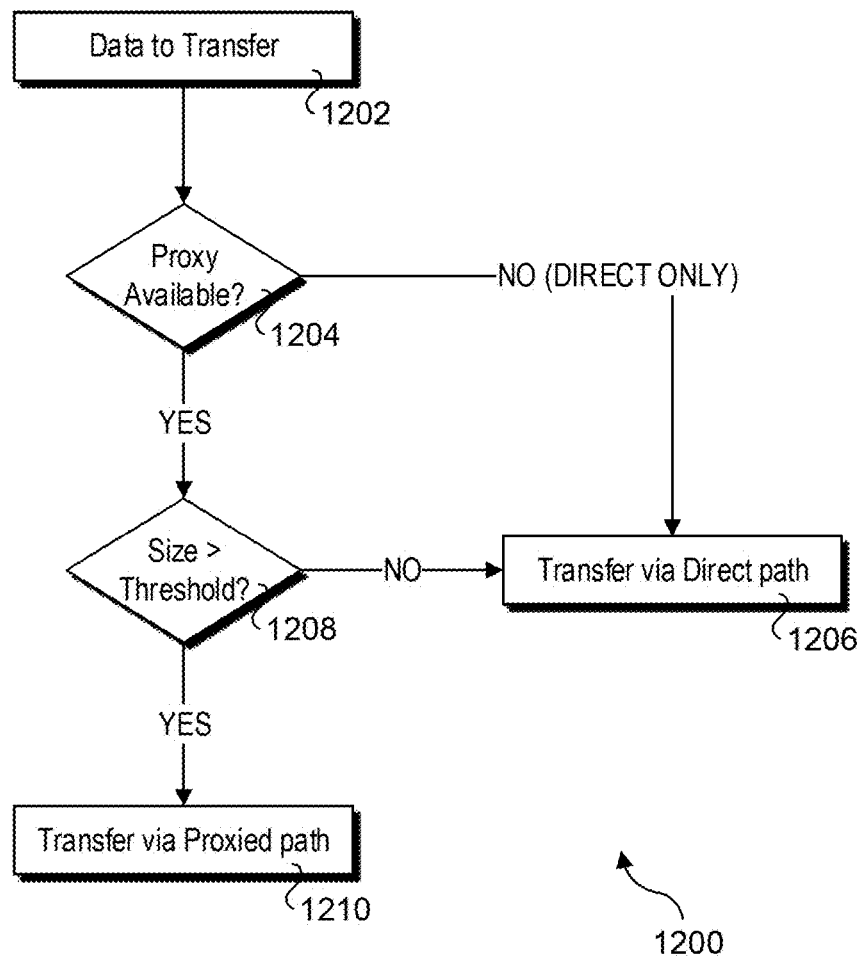
FIG. 12 is a flowchart illustrating operations and logic for implementing MPI dual DAPL, according to one embodiment

FIG. 12 shows a flowchart 1200 illustrating operations and logic for implementing MPI dual DAPL, according to one embodiment. The process starts in response to an MPI application detecting it has data to transfer, as shown in a block 1202. In a decision block 1204 a determination is made to whether a proxied transfer path is available, or if only a direct P2P path is available. If only a direct P2P path is available, the logic proceeds to a block 1206 in which a transfer is effected using a direct path, such as using CCL direct.

If both a proxied path and a direct path are available, a determination is made in a decision block 1208 to whether the size of the data transfer exceeds a threshold. For example, a threshold size may be determined by performing comparative data transfer performance test using different size transfers over both direct paths and proxied paths. For data transfers having a size greater than the threshold, the transfer is made using a proxied path, as depicted in a block 1210. For transfers less than the threshold, the answer to decision block 1208 is NO, resulting in the logic proceeding to block 1206 to effect a transfer using a direct path.

Further aspects of the subject matter describe herein are set out in the following numbered clauses:

Clause 1. A method comprising:

implementing a proxy to transfer first data from a first Peripheral Component Interconnect Express (PCIe) card coupled to a first PCIe interconnect to a PCIe InfiniBand (IB) Host Channel Adapter (HCA) coupled to the PCIe interconnect and an IB fabric, the first data to be sent from the first PCIe card via the IB HCA to a destination accessible via the IB fabric;

receiving second data from the IB fabric at the PCIe IB HCA destined for the first PCIe card; and transferring the second data from the IB HCA directly to the first PCIe card via a first PCIe peer-to-peer (P2P) data transfer, wherein the first PCIe interconnect is communicatively coupled to a first host processor having first host memory, and a data path corresponding to the proxy transfer of the first data comprises a first data transfer from the first PCIe card to the first host memory, and a second data transfer from the first host memory to the IB HCA.

Clause 2. The method of clause 1, further comprising implementing a first transmit shadow queue in the first host memory, and implementing a second receive shadow queue in memory on the first PCIe card, wherein the transmit shadow queue corresponds to a transmit half of a first shadow queue pair, and the second receive shadow queue corresponds to a receive half of a second shadow queue pair.

Clause 3. The method of clause 1 or 2, further comprising transferring third data from the first PCIe card to the IB HCA directly to via a second PCIe P2P transfer.

Clause 4. The method of clause 3, further comprising implementing a data transfer threshold to determine whether a transfer of data from the first PCIe card to the IB HCA is to be forwarded via a proxied path or via a direct P2P path.

Clause 5. The method of any of the proceeding clauses, wherein the first PCIe card comprises a processor with many integrated cores (MIC).

Clause 6. The method of any of the proceeding clauses, wherein the first PCIe card and the IB HCA are coupled to a first PCIe interconnect that is implemented in a local socket in a multi-socket server platform, the method further comprising implementing a proxy to transfer third data from a second PCIe card connected to a second PCIe interconnect implemented in a remote socket of the multi-socket server platform to the IB HCA.

Clause 7. The method of clause 6, wherein the multi-socket server platform is configured in a Non-Uniform Memory Access (NUMA) architecture under which each socket includes a respective host processor coupled to host memory and PCIe interconnect communicatively coupled to the host processor, wherein the first PCIe interconnect resides in a local socket including a first host processor and first host memory, wherein the second PCIe interconnect resides in a remote socket include a second host processor, wherein the multi-socket server platform further includes a socket-to-socket interconnect communicatively coupling the first and second host processors, and wherein implementing the proxy to transfer the third data from the second PCIe card to the IB HCA comprises performing NUMA Direct Memory Access (DMA) transfer from memory on the second PCIe card to the first host memory.

Clause 8. The method of any of the proceeding clauses 1, wherein the first PCIe card and the IB HCA are coupled to a first PCIe interconnect that is implemented in a local socket in a multi-socket server platform, the method further comprising implementing a proxy to transfer third data received from the IB fabric at the IB HCA from the IB HCA to a second PCIe card connected to a second PCIe interconnect implemented in a remote socket of the multi-socket server platform.

Clause 9. The method of clause 8, wherein the multi-socket server platform is configured in a Non-Uniform Memory Access (NUMA) architecture under which each socket includes a respective host processor coupled to host memory and PCIe interconnect communicatively coupled to the host processor, wherein the first PCIe interconnect resides in a local socket including a first host processor and first host memory, wherein the second PCIe interconnect resides in a remote socket include a second host processor, wherein the multi-socket server platform further includes a socket-to-socket interconnect communicatively coupling the first and second host processors, and wherein implementing the proxy to transfer the third data from the IB HCA to the second PCIe card comprises performing NUMA Direct Memory Access (DMA) transfer from the IB HCA to the second host memory.

Clause 10. A tangible, non-transient machine-readable medium having software instructions stored thereon configured to be executed one at least one processor to perform the method of any of the proceeding clauses.

Clause 11. A Peripheral Component Interconnect Express (PCIe) apparatus, configured to be installed in a multi-socket server platform including a local socket having a first host processor coupled to first host memory and a first PCIe interconnect and a remote socket having a second host processor coupled to second host memory and a second PCIe interconnect, the multi-socket server platform further including an InfiniBand (IB) Host Channel Adaptor (HCA) coupled to the first PCIe interconnect, the PCIe apparatus comprising:

a processor; and memory, coupled to the processor, having software instructions stored thereon to perform operations when executed by the processor, enabling the apparatus to, allocate a first transmit queue in the memory;

queue first data in the first transmit queue, the first data to be transferred outbound from the multi-socket server platform via the IB HCA;

transfer the first data from the first transmit queue to a first proxy agent hosted by the first host processor, the first data to be forwarded by the first proxy agent to the IB HCA; and receive second data sent from the IB HCA, wherein the first and second data are transferred between the PCIe apparatus and the IB HCA along different paths, and wherein the PCIe apparatus is configured to be installed in each, one at a time, of a first PCIe slot coupled to the first PCIe interconnect and a second PCIe slot coupled to the second PCIe interconnect.

Clause 12. The PCIe apparatus of clause 11, wherein the second data is received from the IB HCA via a direct PCIe peer-to-peer (P2P) data transfer.

Clause 13. The PCIe apparatus of clause 11 or 12, wherein the software instructions are further to:

interface with software running on the first host processor to allocate a transmit shadow queue; and perform a direct memory access (DMA) data transfer to transfer the first data to the transmit shadow queue.

Clause 14. The PCIe apparatus of any of clauses 11-13, wherein the software instructions are further to:

interface with software running on an apparatus external to the multi-socket server platform from which the second data is sent to allocate a receive shadow queue; and buffer the second data in the receive shadow queue as it is received from the IB HCA.

Clause 15. The PCIe apparatus of any of clauses 11-14, wherein the software instructions are further to establish a Symmetric Communications Interface (SCIF) connection with the first proxy agent and transfer the first data to the first proxy agent via the SCIF connection.

Clause 16. The PCIe apparatus of any of clauses 11-15, wherein the software instructions are further to:

allocate a second transmit queue in the memory;

queue third data in the second transmit queue, the third data to be transferred outbound from the multi-socket server platform via the IB HCA; and transfer the third data from the second transmit queue to the IB HCA directly to via a second direct PCIe P2P transfer.

Clause 17. The PCIe apparatus of clause 16, wherein the software instructions are further to implement a data transfer threshold to determine whether a transfer of data from the PCIe apparatus to the IB HCA is to be forwarded via a proxied path using the first proxy agent or via a direct P2P path.

Clause 18. The PCIe apparatus of any of clauses 11-17, wherein each of the local and remote sockets are configured in a Non-Uniform Memory Access (NUMA) architecture, and the first and second processors are communicatively coupled via a socket-to-socket interconnect, and wherein when the PCIe apparatus is installed in the second PCIe slot the first data is transferred from the first transmit queue to the first proxy agent via a NUMA data transfer including a path through the socket-to-socket interconnect.

Clause 19. The PCIe apparatus of any of clauses 11-18, wherein each of the local and remote sockets are configured in a Non-Uniform Memory Access (NUMA) architecture, and the first and second processors are communicatively coupled via a socket-to-socket interconnect, and wherein when the PCIe apparatus is installed in the second PCIe slot the second data is transferred from the IB HCA to a second proxy hosted by the second processor that forwards the second data to the PCIe apparatus.

Clause 20. The PCIe apparatus of any of clauses 11-19, wherein the PCIe apparatus comprises a many integrated core (MIC) apparatus and the processor includes many integrated cores.

Clause 21. The PCIe apparatus of any of clauses 11-20, wherein the software instructions further are to implement a data transfer interface accessible to a software application that generates the first data and receives the second data that is an Open Fabrics Enterprise Distribution (OFED)-compliant interface and supports use of IB verbs.

Clause 22. A tangible, non-transient machine-readable medium having software instructions stored thereon configured be installed in a distributed manner on components in a multi-socket server platform including a local socket having a first host processor coupled to first host memory and a first Peripheral Component Interconnect Express (PCIe) interconnect and a remote socket having a second host processor coupled to second host memory and a second PCIe interconnect, the multi-socket server platform further including an InfiniBand (IB) Host Channel Adaptor (HCA) coupled to the first PCIe interconnect, the local socket comprising a local socket and the remote socket comprising a remote socket, the software instructions comprising:

first software instructions configured to be run on each of the first and second host processor, including instructions for implanting a respective proxy agent on the first and second processors; and second software instructions configured to be run on a respective PCIe cards coupled to the first PCIe interconnect and the second PCIe interconnect, wherein the first software instructions and second software instructions are configured to facilitate data transfers including, a first data transfer of first data from a first PCIe card to the IB HCA, the first data being transferred from the first PCIe card to a first proxy agent, and then forwarded from the first proxy agent to the IB HCA; and a second data transfer of second data from the IB HCA to a second PCIe card, the second data being transferred from the first PCIe card to a second proxy agent, and then forwarded from the second proxy agent to the IB HCA.

Clause 23. The tangible, non-transient machine-readable medium of clause 22, wherein the software instructions further comprise instructions for implementing a Symmetric Communications Interface (SCIF) connection between the first PCIe card and the first proxy agent.

Clause 24. The tangible, non-transient machine-readable medium of clause 22 or 23, wherein the multi-socket server platform comprises a first platform including a first local socket having a first IB HCA and a first remote socket, and the software instructions are further configured to be implemented on a second multi-socket server platform comprising a second platform including a second local socket having a second IB HCA and a second remote socket to facilitate a transfer of data between a first PCIe card in the first platform to a second PCIe card in the second platform via a proxied datapath to transfer data from the first PCIe card to the first IB HCA and a direct datapath from the second IB HCA to the second PCIe card.

Clause 25. The tangible, non-transient machine-readable medium of clause 24, wherein the first PCIe card is installed in a PCIe slot in the first remote socket of the first platform, and wherein the second PCIe card is installed in a PCIe slot in the second local socket of the second platform.

Clause 26. The tangible, non-transient machine-readable medium of any of clauses 22-25, wherein the multi-socket server platform comprises a first platform including a first local socket having a first IB HCA and a first remote socket, and the software instructions are further configured to be implemented on a second multi-socket server platform comprising a second platform including a second local socket having a second IB HCA and a second remote socket to facilitate a transfer of data between a first PCIe card in the first platform to a second PCIe card in the second platform via a first proxied datapath to transfer data from the first PCIe card to the first IB HCA and a second proxied datapath to transfer data from the second IB HCA to the second PCIe card.

Clause 27. The tangible, non-transient machine-readable medium of clause 26, wherein the first PCIe card is installed in a PCIe slot in the first remote socket of the first platform, and wherein the second PCIe card is installed in a PCIe slot in the second remote socket of the second platform.

Clause 28. The tangible, non-transient machine-readable medium of clause 26, wherein the first PCIe card is installed in a PCIe slot in the first local socket of the first platform, and wherein the second PCIe card is installed in a PCIe slot in the second remote socket of the second platform.

Clause 29. The tangible, non-transient machine-readable medium of any of clauses 22-28, wherein the second software instructions include an instructions for implementing a dual mode transfer interface under which data may be selectively transferred from a PCIe card to an IB HCA that are coupled to a common PCIe interconnect using either a proxied datapath or a direct datapath comprising PCIe peer-to-peer (P2P) data transfer.

Clause 30. The tangible, non-transient machine-readable medium of any of clauses 22-19, wherein the software instructions are configured to installed on first and second multi-socket server platforms each of which includes a local socket having a local IB adapter and a remote socket, and the software instructions are further configured to facilitate each of the following type of transfers between PCIe card installed in the first and second multi-socket server platforms: local socket to local socket; local socket to remote socket; remote socket to local socket; and remote socket to remote socket.

Clause 31. A multi-socket server platform comprising:
a local socket having a first host processor coupled to first host memory and a first Peripheral Component Interconnect Express (PCIe) interconnect having at least two local socket PCIe slots;
a remote socket having a second host processor coupled to second host memory and a second PCIe interconnect having at least two remote socket PCIe slots;
a socket-to-socket interconnect coupling the first host processor in communication with the second host processor;
an InfiniBand (IB) Host Channel Adaptor (HCA) installed in a first of the local socket PCIe slots;
a first PCIe card installed in a second of the local socket PCIe slots;
a second PCIe card installed in a first of the remote socket PCIe slots;
wherein the multi-socket server platform is configured to,
proxy a transfer of first data from the first PCIe card to the PCIe IB HCA via a first proxy agent hosted by the first host processor;
receive second data from an IB fabric at the PCIe IB HCA destined for the first PCIe card; and
transfer the second data from the PCIe IB HCA directly to the first PCIe card via a first PCIe peer-to-peer (P2P) data transfer.

Clause 32. The multi-socket server platform of clause 31, wherein the multi-socket server platform is further configured to proxy a transfer of third data from the second PCIe card to the PCIe IB HCA via the first proxy agent.

Clause 33. The multi-socket server platform of clause 31 or 32, wherein the multi-socket server platform is further configured to:
receive fourth data from the IB fabric at the PCIe IB HCA destined for the second PCIe card; and
transfer the fourth data from the PCIe IB HCA to the second PCIe card via a second proxy agent hosted by the second host processor.

Clause 34. The multi-socket server platform of any of clauses 31-33, wherein the multi-socket server platform is further configured to:
determine whether an amount of data to be transferred from the first PCIe card to the PCIe IB HCA exceeds a threshold; and
if the amount of data to be transferred exceeds the threshold, forwarding the data from the first PCIe card via the first proxy agent to the PCIe IB HCA; otherwise
if the amount of data to be transferred doesn't exceed the threshold, transferring the data from the first PCIe card to the PCIe IB HCA via a second PCIe P2P data transfer;

Clause 35. A multi-socket server platform of any of clauses 31-34, wherein each of the first and second PCIe cards comprise an MIC card with at least one processor having many integrated cores.

Clause 36. A multi-socket server platform comprising:
a local socket having a first host processor coupled to first host memory and a first Peripheral Component Interconnect Express (PCIe) interconnect and a remote socket having a second host processor coupled to second host memory and a second PCIe interconnect;
a socket-to-socket interconnect;
an InfiniBand (IB) Host Channel Adaptor (HCA) coupled to the first PCIe interconnect; and
a PCIe card, coupled to one of the first and second PCIe interconnect, including a processor coupled to memory,
wherein the multi-socket server platform further comprises means for,
allocating a first transmit queue in the memory of the PCIe card;
queuing first data in the first transmit queue, the first data to be transferred outbound from the multi-socket server platform via the IB HCA;
transferring the first data from the first transmit queue to a first proxy agent hosted by the first host processor, the first data to be forwarded by the first proxy agent to the IB HCA; and
receiving second data sent from the IB HCA,
wherein the first and second data are transferred between the PCIe card and the IB HCA along different paths, Clause 37. The multi-socket server platform of clause 36, wherein the second data is received from the IB HCA via a direct PCIe peer-to-peer (P2P) data transfer.

Clause 38. The multi-socket server platform of clause 36 or 37, further comprising means for:
allocating a transmit shadow queue; and
performing a direct memory access (DMA) data transfer to transfer the first data to the transmit shadow queue.

Clause 39. The multi-socket server platform of any of clauses 36-38, further comprising means for:

interfacing with software running on an apparatus external to the multi-socket server platform from which the second data is sent to allocate a receive shadow queue; and buffering the second data in the receive shadow queue as it is received from the IB HCA.

Clause 40. The multi-socket server platform of any of clauses 36-39, for comprising means for:

allocating a second transmit queue in the memory;

queuing third data in the second transmit queue, the third data to be transferred outbound from the multi-socket server platform via the IB HCA; and transferring the third data from the second transmit queue to the IB HCA directly to via a second direct PCIe P2P transfer.

Clause 41. The multi-socket server platform of clause 40, further comprising means for implementing a data transfer threshold to determine whether a transfer of data from the PCIe apparatus to the IB HCA is to be forwarded via a proxied path using the first proxy agent or via a direct P2P path.

As described above and illustrated in the Figures herein, various software components are installed on host processors and MICs to facilitate data transfers between MICs in multi-socket server platforms using local-local, local-remote, remote-local, and remote-remote data transfers. In one embodiment the software is stored on a tangible, non-transient machine-readable medium and loaded onto at least one of the platforms host processor. Applicable software components are then distributed to the MICs, wherein the software components on the hosts and MICs are configured to facilitate proxied and direct data transfers that are optimized for the given transfer.

Thus, embodiments of this invention may be used as or to support software instructions executed upon some form of processing core (such as host CPU or core in a MIC processor) or otherwise implemented or realized upon or within a machine-readable medium. A machine-readable medium includes any tangible, non-transient mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:

implementing a proxy to transfer first data from a first Peripheral Component Interconnect Express (PCIe) card coupled to a first PCIe interconnect to a PCIe InfiniBand (IB) Host Channel Adapter (HCA) coupled to the PCIe interconnect and an IB fabric, the first data to be sent from the first PCIe card via the IB HCA to a destination accessible via the IB fabric;

receiving second data from the IB fabric at the PCIe IB HCA destined for the first PCIe card; and transferring the second data from the IB HCA directly to the first PCIe card via a first PCIe peer-to-peer (P2P) data transfer, wherein the first PCIe interconnect is communicatively coupled to a first host processor having first host memory, and a data path corresponding to the proxy transfer of the first data comprises a first data transfer from the first PCIe card to the first host memory, and a second data transfer from the first host memory to the IB HCA.

2. The method of claim 1, further comprising implementing a first transmit shadow queue in the first host memory, and implementing a second receive shadow queue in memory on the first PCIe card, wherein the transmit shadow queue corresponds to a transmit half of a first shadow queue pair, and the second receive shadow queue corresponds to a receive half of a second shadow queue pair.

3. The method of claim 1, further comprising transferring third data from the first PCIe card to the IB HCA directly to via a second PCIe P2P transfer.

4. The method of claim 3, further comprising:
implementing a data transfer threshold to determine whether a transfer of data from the first PCIe card to the IB HCA is to be forwarded via a proxied path or via a direct P2P path.

5. The method of claim 1, wherein the first PCIe card comprises a processor with many integrated cores (MIC).

6. The method of claim 1, wherein the first PCIe card and the IB HCA are coupled to a first PCIe interconnect that is implemented in a local socket in a multi-socket server platform, the method further comprising:
implementing a proxy to transfer third data from a second PCIe card connected to a second PCIe interconnect implemented in a remote socket of the multi-socket server platform to the IB HCA.

7. The method of claim 6, wherein the multi-socket server platform is configured in a Non-Uniform Memory Access (NUMA) architecture under which each socket includes a respective host processor coupled to host memory and PCIe interconnect communicatively coupled to the host processor, wherein the first PCIe interconnect resides in a local socket including a first host processor and first host memory, wherein the second PCIe interconnect resides in a remote socket include a second host processor, wherein the multi-socket server platform further includes a socket-to-socket interconnect communicatively coupling the first and second host processors, and wherein implementing the proxy to transfer the third data from the second PCIe card to the IB HCA comprises performing NUMA Direct Memory Access (DMA) transfer from memory on the second PCIe card to the first host memory.

8. The method of claim 1, wherein the first PCIe card and the IB HCA are coupled to a first PCIe interconnect that is implemented in a local socket in a multi-socket server platform, the method further comprising:
implementing a proxy to transfer third data received from the IB fabric at the IB HCA from the IB HCA to a second PCIe card connected to a second PCIe interconnect implemented in a remote socket of the multi-socket server platform.

9. The method of claim 8, wherein the multi-socket server platform is configured in a Non-Uniform Memory Access (NUMA) architecture under which each socket includes a respective host processor coupled to host memory and PCIe interconnect communicatively coupled to the host processor, wherein the first PCIe interconnect resides in a local socket including a first host processor and first host memory, wherein the second PCIe interconnect resides in a remote socket include a second host processor, wherein the multi-socket server platform further includes a socket-to-socket interconnect communicatively coupling the first and second host processors, and wherein implementing the proxy to transfer the third data from the IB HCA to the second PCIe card comprises performing NUMA Direct Memory Access (DMA) transfer from the IB HCA to the second host memory.

10. The method of claim 1, wherein the first PCIe card includes a processor and memory hosting a software application that generates the first data and receives the second data, and wherein transfers of each of the first and second data is performed in a manner that is transparent to a software application.

11. A Peripheral Component Interconnect Express (PCIe) apparatus, configured to be installed in a multi-socket server platform including a local socket having a first host processor coupled to first host memory and a first PCIe interconnect and a remote socket having a second host processor coupled to second host memory and a second PCIe interconnect, the multi-socket server platform further including an InfiniBand (IB) Host Channel Adaptor (HCA) coupled to the first PCIe interconnect, the PCIe apparatus comprising:
a processor; and
memory, coupled to the processor, having software instructions stored thereon to perform operations when executed by the processor, enabling the apparatus to,
allocate a first transmit queue in the memory;
queue first data in the first transmit queue, the first data to be transferred outbound from the multi-socket server platform via the IB HCA;
transfer the first data from the first transmit queue to a first proxy agent hosted by the first host processor, the first data to be forwarded by the first proxy agent to the IB HCA; and
receive second data sent from the IB HCA,
wherein the first and second data are transferred between the PCIe apparatus and the IB HCA along different paths, and wherein the PCIe apparatus is configured to be installed in each, one at a time, of a first PCIe slot coupled to the first PCIe interconnect and a second PCIe slot coupled to the second PCIe interconnect.

12. The PCIe apparatus of claim 11, wherein the second data is received from the IB HCA via a direct PCIe peer-to-peer (P2P) data transfer.

13. The PCIe apparatus of claim 11, wherein the software instructions are further to:
interface with software running on the first host processor to allocate a transmit shadow queue; and
perform a direct memory access (DMA) data transfer to transfer the first data to the transmit shadow queue.

14. The PCIe apparatus of claim 11, wherein the software instructions are further to:
interface with software running on an apparatus external to the multi-socket server platform from which the second data is sent to allocate a receive shadow queue; and
buffer the second data in the receive shadow queue as it is received from the IB HCA.

15. The PCIe apparatus of claim 11, wherein the software instructions are further to establish a Symmetric Communications Interface (SCIF) connection with the first proxy agent and transfer the first data to the first proxy agent via the SCIF connection.

16. The PCIe apparatus of claim 11, wherein the software instructions are further to:
allocate a second transmit queue in the memory;
queue third data in the second transmit queue, the third data to be transferred outbound from the multi-socket server platform via the IB HCA; and
transfer the third data from the second transmit queue to the IB HCA directly to via a second direct PCIe P2P transfer.

17. The PCIe apparatus of claim 16, wherein the software instructions are further to
implement a data transfer threshold to determine whether a transfer of data from the PCIe apparatus to the IB HCA is to be forwarded via a proxied path using the first proxy agent or via a direct P2P path.

18. The PCIe apparatus of claim 11, wherein each of the local and remote sockets are configured in a Non-Uniform Memory Access (NUMA) architecture, and the first and second processors are communicatively coupled via a socket-to-socket interconnect, and wherein when the PCIe apparatus is installed in the second PCIe slot the first data is transferred from the first transmit queue to the first proxy agent via a NUMA data transfer including a path through the socket-to-socket interconnect.

19. The PCIe apparatus of claim 11, wherein each of the local and remote sockets are configured in a Non-Uniform Memory Access (NUMA) architecture, and the first and second processors are communicatively coupled via a socket-to-socket interconnect, and wherein when the PCIe apparatus is installed in the second PCIe slot the second data is transferred from the IB HCA to a second proxy hosted by the second processor that forwards the second data to the PCIe apparatus.

20. The PCIe apparatus of claim 11, wherein the PCIe apparatus comprises a many integrated core (MIC) apparatus and the processor includes many integrated cores.

21. The PCIe apparatus of claim 11, wherein the software instructions further are to implement a data transfer interface accessible to a software application that generates the first data and receives the second data that is an Open Fabrics Enterprise Distribution (OFED)-compliant interface and supports use of IB verbs.

22. A tangible, non-transient machine-readable medium having software instructions stored thereon configured to be installed in a distributed manner on components in a multi-socket server platform including a local socket having a first host processor coupled to first host memory and a first Peripheral Component Interconnect Express (PCIe) interconnect and a remote socket having a second host processor coupled to second host memory and a second PCIe interconnect, the multi-socket server platform further including an InfiniBand (IB) Host Channel Adaptor (HCA) coupled to the first PCIe interconnect, the local socket comprising a local socket and the remote socket comprising a remote socket, the software instructions comprising:
first software instructions configured to be run on each of the first and second host processor, including instructions for implementing a respective proxy agent on the first and second processors; and
second software instructions configured to be run on a respective PCIe cards coupled to the first PCIe interconnect and the second PCIe interconnect,
wherein the first software instructions and second software instructions are configured to facilitate data transfers including,
a first data transfer of first data from a first PCIe card to the IB HCA, the first data being transferred from the first PCIe card to a first proxy agent, and then forwarded from the first proxy agent to the IB HCA; and
a second data transfer of second data from the IB HCA to a second PCIe card, the second data being transferred from the first PCIe card to a second proxy agent, and then forwarded from the second proxy agent to the IB HCA.

23. The tangible, non-transient machine-readable medium of claim 22, wherein the software instructions further comprise instructions for implementing a Symmetric Communications Interface (SCIF) connection between the first PCIe card and the first proxy agent.

24. The tangible, non-transient machine-readable medium of claim 22, wherein the multi-socket server platform comprises a first platform including a first local socket having a first IB HCA and a first remote socket, and the software instructions are further configured to be implemented on a second multi-socket server platform comprising a second platform including a second local socket having a second IB HCA and a second remote socket to facilitate a transfer of data between a first PCIe card in the first platform to a second PCIe card in the second platform via a proxied datapath to transfer data from the first PCIe card to the first IB HCA and a direct datapath from the second IB HCA to the second PCIe card.

25. The tangible, non-transient machine-readable medium of claim 24, wherein the first PCIe card is installed in a PCIe slot in the first remote socket of the first platform, and wherein the second PCIe card is installed in a PCIe slot in the second local socket of the second platform.

26. The tangible, non-transient machine-readable medium of claim 22, wherein the multi-socket server platform comprises a first platform including a first local socket having a first IB HCA and a first remote socket, and the software instructions are further configured to be implemented on a second multi-socket server platform comprising a second platform including a second local socket having a second IB HCA and a second remote socket to facilitate a transfer of data between a first PCIe card in the first platform to a second PCIe card in the second platform via a first proxied datapath to transfer data from the first PCIe card to the first IB HCA and a second proxied datapath to transfer data from the second IB HCA to the second PCIe card.

27. The tangible, non-transient machine-readable medium of claim 26, wherein the first PCIe card is installed in a PCIe slot in the first remote socket of the first platform, and wherein the second PCIe card is installed in a PCIe slot in the second remote socket of the second platform.

28. The tangible, non-transient machine-readable medium of claim 26, wherein the first PCIe card is installed in a PCIe slot in the first local socket of the first platform, and wherein the second PCIe card is installed in a PCIe slot in the second remote socket of the second platform.

29. The tangible, non-transient machine-readable medium of claim 22, wherein the second software instructions include an instructions for implementing a dual mode transfer interface under which data may be selectively transferred from a PCIe card to an IB HCA that are coupled to a common PCIe interconnect using either a proxied datapath or a direct datapath comprising PCIe peer-to-peer (P2P) data transfer.

30. The tangible, non-transient machine-readable medium of claim 22, wherein the software instructions are configured to installed on first and second multi-socket server platforms each of which includes a local socket having a local IB adapter and a remote socket, and the software instructions are further configured to facilitate each of the following type of transfers between PCIe card installed in the first and second multi-socket server platforms:
local socket to local socket;
local socket to remote socket;
remote socket to local socket; and
remote socket to remote socket.

* * * * *